US012632125B2

(12) United States Patent
Sakovich et al.

(10) Patent No.: US 12,632,125 B2
(45) Date of Patent: May 19, 2026

(54) KEYBOARD

(71) Applicant: Clevetura LTD, Limassol (CY)

(72) Inventors: Raman Sakovich, Limassol (CY); Mikhail Krupiankou, Limassol (CY); Yury Lahutsik, Limassol (CY); Pavel Dubinin, Limassol (CY); Siarhei Kostevitch, Limassol (CY)

(73) Assignee: Clevetura LTD, Limassol (CY)

( * ) Notice: Subject to any disclaimer, the term of this patent is extended or adjusted under 35 U.S.C. 154(b) by 0 days.

(21) Appl. No.: 18/600,712

(22) Filed: Mar. 9, 2024

(65) Prior Publication Data

US 2024/0385695 A1     Nov. 21, 2024

(30) Foreign Application Priority Data

Mar. 10, 2023    (GB) ...................................... 2303579

(51) Int. Cl.
| | |
|---|---|
| *G06F 3/02* | (2006.01) |
| *F21V 33/00* | (2006.01) |
| *G06F 3/023* | (2006.01) |
| *G06F 3/041* | (2006.01) |

(52) U.S. Cl.
CPC .......... *G06F 3/021* (2013.01); *F21V 33/0052* (2013.01); *G06F 3/023* (2013.01); *G06F 3/0416* (2013.01)

(58) Field of Classification Search
CPC ........ G06F 3/021; G06F 3/023; G06F 3/0416; F21V 33/0052
See application file for complete search history.

(56) References Cited

U.S. PATENT DOCUMENTS

| | | | | |
|---|---|---|---|---|
| 9,436,304 | B1 | 9/2016 | Leiba et al. | |
| 10,852,843 | B1* | 12/2020 | Kamepalli | ............. H01H 13/84 |
| 2016/0085437 | A1* | 3/2016 | Hamara | ................ A63F 13/285 |
| | | | | 463/31 |
| 2016/0116993 | A1* | 4/2016 | Leyon | ................... G06F 3/0233 |
| | | | | 345/170 |
| 2019/0086955 | A1* | 3/2019 | Li | .......................... G06F 3/0227 |
| 2020/0356182 | A1* | 11/2020 | Kamepalli | ............. G06N 20/00 |
| 2021/0247849 | A1 | 8/2021 | Sokol et al. | |
| 2021/0349548 | A1* | 11/2021 | Chan | ..................... G06F 3/0202 |
| 2022/0398001 | A1* | 12/2022 | Lahutsik | ............ H03K 17/9622 |

* cited by examiner

*Primary Examiner* — Peter D McLoone
(74) *Attorney, Agent, or Firm* — Hodgson Russ LLP

(57) ABSTRACT

There is described a method of controlling a keyboard comprising a backlight and a touch sensor, the method comprising: detecting, using the touch sensor, a gesture performed by a user of the keyboard; and controlling the backlight so as to emit light in dependence on the detected gesture.

20 Claims, 10 Drawing Sheets

2000

2014

2012

2010

2020            2022

2064    2062    2060

2070

KEYBOARD

FIELD OF THE DISCLOSURE

The present disclosure relates to a keyboard. In particular, the present disclosure relates to a keyboard comprising a touch sensor. The present disclosure further relates to methods of, and systems for, altering an operation parameter relating to the keyboard. The present disclosure further relates to a backlight for the keyboard and a method of operating the backlight.

BACKGROUND OF THE DISCLOSURE

A typical method of controlling the operation of computer devices is to use a keyboard and/or a touchpad. These components enable a user to interact with a computer, e.g. to send instructions to a processor. Ideally, these components are user-friendly; however, present keyboards and touchpads have a number of flaws.

A particular problem is that in order to use a conventional touchpad after typing a user must move their hand from the keyboard to the touchpad. In order to begin typing again at full speed, the user must move this hand back from the touchpad to the keyboard. While this movement can be quite quick, it is likely to be repeated thousands of times over the course of a year, which can lead to a significant cumulative time and focus requirement. Therefore, it would be beneficial to integrate a touch sensor with a keyboard to reduce the need for this movement. However, this integration can lead to a keyboard that lacks user friendliness and is bulky.

A solution to this problem is desired.

BRIEF SUMMARY OF THE DISCLOSURE

According to an aspect of the present disclosure, there is described: a keyboard comprising a method of altering an operation parameter relating to an operation of a user, the operation parameter being associated with a keyboard that comprises a touch sensor, the method comprising: receiving an input from a user; determining an operation associated with the input; determining an input parameter associated with the operation; and altering an operation parameter associated with the operation in dependence on the input parameter.

Preferably, the operation comprises a gesture. Preferably, determining the operation comprises detecting the gesture using the touch sensor.

Preferably, the operation parameter comprises a parameter associated with the registration of the operation and/or a parameter required for the registration of the operation.

Preferably, the operation parameter comprises a threshold parameter.

Preferably, the operation comprises a gesture. Preferably, receiving the input comprises receiving the input at a touch sensor. Preferably, determining the operation comprises determining the gesture.

According to an aspect of the present disclosure, there is described: a method of altering an operation parameter relating to a gesture performed by a user, the operation parameter being associated with a keyboard that comprises a touch sensor, the method comprising: detecting an input of a user using the touch sensor; determining a gesture associated with the input; determining an input parameter associated with the gesture; and altering an operation parameter required for the registration of the gesture in dependence on the input parameter.

Preferably, the input parameter and/or the operation parameter comprises one or more of: one or more coordinates associated with the operation; a distance associated with the operation; a number of fingers used for the operation; a distance of movement of a finger during the operation; a speed of the operation; a duration of the operation; a direction of the operation; a location of the operation; a shape of the operation; and a time between the performance of the operation and a further operation.

Preferably, the method comprises: determining a plurality of inputs; determining a plurality of operations that are associated with a plurality of the inputs; and determining a plurality of input parameters associated with the plurality of operations.

Preferably, the method comprises determining that the operation is a mode-switching operation.

Preferably, the method comprises determining a mode of the keyboard. Preferably, the altering of the operation parameter is dependent on the keyboard being in a learning mode.

Preferably, the method comprises registering the operation in dependence on the mode of the keyboard. Preferably, the operation is not registered when the keyboard is in a learning mode.

Preferably, the method comprises determining that the operation is an unintentional operation. Preferably, the method comprises determining that the operation is an unintentional operation in dependence on the input parameter and/or in dependence on a mode of the keyboard.

Preferably, altering the operation parameter comprises altering a default operation parameter.

Preferably, the method comprises determining a user of the keyboard. Preferably, the method comprises altering an operation parameter associated with the user.

Preferably, the method comprises altering the operation parameter in dependence on a sensitivity setting of the keyboard and/or in dependence on a target ratio of valid gestures to invalid gestures.

Preferably, the method comprises determining input parameters associated with a plurality of users; and altering an operation parameter for one or more of the users based on the corresponding input parameters.

Preferably, the method comprises determining that the keyboard is in a first mode; and determining an operation associated with a second mode.

Preferably, the method comprises determining that the keyboard is in a typing mode. Preferably, the method comprises determining a gesture and/or altering an operation parameter associated with a gesture.

Preferably, the method comprises determining that the keyboard is in a touch mode. Preferably, the method comprises determining a keypress and/or altering an operation parameter associated with a keypress.

Preferably, the method comprises switching a mode of the keyboard. Preferably, the method comprises switching out of a learning mode of the keyboard. Preferably, the method comprises switching out of the learning mode in dependence on the altering of the parameter and/or switching out of the learning mode based on a determination of an experience of a user of a keyboard.

Preferably, the method comprises altering the parameter based on a machine learning model and/or determining that an operation is an unintentional operation based on a machine learning model.

Preferably, the method comprises determining the operation using a machine learning model.

Preferably, the machine learning model is stored on the keyboard.

Preferably, the machine learning model is updated based on one or more of: the input; the operation; and the input parameter.

Preferably, altering the operation parameter comprises altering a feature of a machine learning model, preferably altering a weighting of a machine learning model.

Preferably, the method comprises outputting the altered operation parameter and/or storing the altered operation parameter, preferably storing the altered operation parameter on a memory of the keyboard.

Preferably, the method comprises determining a location of the input; and altering the operation parameter in dependence on the location.

Preferably, the operation parameter and/or the altered operation parameter is dependent on a location of an operation.

Preferably, the method comprises determining a delay between the operation and a prior keypress; and altering the operation parameter in dependence on the delay. Preferably, the operation parameter relates to a required delay.

Preferably, the method comprises registering (e.g. performing) the operation in dependence (e.g. in dependence on a comparison between) the input parameter and the operation parameter.

Preferably, the method comprises: receiving a further input from the user; determining a further operation associated with the further input; determining a further input parameter associated with the further operation; and registering (e.g. performing) the further operation in dependence on (e.g. in dependence on a comparison between) the further input parameter and the altered operation parameter.

Preferably, the method comprises controlling a backlight of a keyboard in dependence on the altering of the parameter.

Preferably, the method comprises determining a feature of the touch sensor; and controlling the backlight so as to emit light, wherein the emitted light is dependent on the feature of the touch sensor.

According to another aspect of the present disclosure, there is described a method of controlling a keyboard comprising a backlight and a touch sensor, the method comprising: determining a feature of the touch sensor; and controlling the backlight so as to emit light, wherein the emitted light is dependent on the feature of the touch sensor.

Preferably, determining the feature comprises detecting a gesture using the touch sensor.

Preferably, the emitted light is dependent on a parameter of the gesture and/or a type of the gesture.

Preferably, the method comprises controlling the backlight to emit light so as to indicate an operation of the keyboard. Preferably, indicating the operation comprises indicating a location of an operation, and/or a type of an operation, and/or a characteristic of an operation.

Preferably, the method comprises controlling the backlight to emit light so as to indicate a location of an object on the keyboard and/or the touch sensor.

Preferably, the method comprises controlling the backlight to emit light in dependence on whether a detected operation is a valid operation.

Preferably, the backlight is arranged to emit: a first type of light when a valid operation is detected; and/or a second type of light when an invalid operation is detected.

Preferably, the method comprises controlling the backlight to emit light so as to indicate a gesture and/or a type of gesture.

Preferably, the method comprises controlling the backlight to emit light in dependence on a mode of the keyboard and/or a change in a mode of the keyboard. Preferably, the method comprises controlling the backlight to emit light in dependence on whether the keyboard is in a touch mode or a typing mode.

Preferably, the method comprises controlling the backlight to emit light in dependence on the keyboard being in a learning mode and/or a gesture learning mode.

Preferably, the method comprises controlling the backlight so as to emit light in dependence on a change in mode.

Preferably, the method comprises controlling the backlight to emit light in dependence on an experience of a user and/or a history of a user.

Preferably, the method comprises controlling the backlight to emit light in dependence on a gesture detected using the touch sensor. Preferably, the method comprises controlling the backlight in dependence on a parameter of the gesture.

Preferably, the method comprises controlling the backlight to emit light so as to indicate one or more touch areas of the keyboard.

Preferably, the method comprises controlling the backlight to emit light so as to indicate a touch area of the keyboard that is in use.

Preferably, the method comprises controlling the backlight to emit light so as to indicate one or more touch sliders on the keyboard.

Preferably, the method comprises controlling the backlight to emit light so as to indicate a connection status of the keyboard.

Preferably, the method comprises controlling the backlight to emit light so as to indicate a selected application, preferably to indicate a touch area associated with the selected application.

Preferably, the method comprises controlling the backlight to emit light so as to indicate a typing position, preferably so as to indicate a desirable position of a user's hands while typing.

Preferably, the method comprises controlling the backlight to emit light so as to operate in dependence on a status of the keyboard and/or of a connected device, preferably so as to indicate one or more of: whether the device is awake or asleep; and a progress of an operation of the device.

Preferably, the method comprises controlling the backlight to emit light so as to operate in dependence on an application of a connected device.

Preferably, the method comprises controlling the backlight to emit light so as to provide an instruction to a user, preferably so as to instruct a user to remove their hands from the keyboard.

Preferably, the method comprises controlling the backlight to emit light so as to indicate a calibration process.

Preferably, the method comprises controlling the backlight to emit light so as to implement an interactive function, preferably a game.

Preferably, the method comprises controlling the backlight to emit light so as to provide ambient lighting, preferably wherein a type of ambient light emitted by the keyboard is dependent on one or more of: an application; a context; and a user.

Preferably, the method comprises controlling the backlight via an application and/or an application programming interface (API).

The method of any preceding claim, comprising controlling the backlight to emit light in dependence on a gesture detected by the touch sensor, preferably a gesture detected during a preceding window of time, more preferably a gesture detected in the preceding ten seconds, the preceding five seconds, and/or the preceding second.

Preferably, the method comprises controlling the backlight the backlight to emit light in dependence on a user input. Preferably, the user input defines one or more of: touch areas; modes; gestures; buttons; sliders; connection devices.

Preferably, the method comprises controlling the backlight so as to emit light comprises emitting a type of light in dependence on the feature. Preferably, the type of light comprises: a colour of emitted light, a pattern of emitted light; a frequency of emitted light; an intensity of emitted light; and/or a location of emitted light.

According to another aspect of the present disclosure, there is described a keyboard comprising a touch sensor, the keyboard being associated with one or more operation parameters, the keyboard comprising: a touch sensor and/or a keypress sensor for receiving an input from a user; and a processor for: determining an operation associated with the input; determining an input parameter associated with the operation; and altering an operation parameter associated with the operation in dependence on the input parameter.

According to another aspect of the present disclosure, there is described a keyboard comprising: a backlight and a touch sensor, wherein the backlight is arranged to emit light, wherein the emitted light is dependent on the feature of the touch sensor.

Preferably the keyboard comprises a processor, wherein the processor is arranged to control the backlight so as to control the emission of the light.

Preferably the keyboard comprises a communications interface, wherein the communications interface is arranged to receive a signal from a connected device so as to control the emission of the light.

Preferably, the touch sensor comprises a capacitive sensor.

Preferably, the touch sensor comprises a mutual capacitance sensor.

Preferably, the touch sensor comprises a self capacitance sensor.

Preferably, the keyboard comprises, and/or is associated with, a control unit.

Preferably, the control unit is arranged to control the keyboard and/or the touch sensor and/or the backlight.

Preferably, the control unit is arranged to process signals from the touch sensor in order to detect touch events and/or keypress events.

Preferably, the control unit is arranged to distinguish between a touch and a keypress.

Preferably, the control unit is arranged to distinguish between a touch and a keypress based on one or more of: a magnitude of a change measured by the touch sensor; a duration of a change measured by the touch sensor; a rate of a change measured by the touch sensor; a direction of a movement measured by the touch sensor; and a mode of the keyboard.

Preferably, the control unit is arranged to distinguish between a touch and a keypress based on a parameter of a detected operation (e.g. a detected possible touch and/or a detected possible keypress).

Preferably, the keyboard is arranged to detect a keypress relating to the keys using the touch sensor.

According to another aspect of the present disclosure, there is described a method of manufacturing the aforesaid keyboard.

According to another aspect of the present disclosure, there is described a method of using the aforesaid keyboard.

According to another aspect of the present disclosure, there is described a system comprising: a keyboard comprising a touch sensor, the keyboard being associated with one or more operation parameters, the keyboard comprising: a touch sensor and, optionally, a keypress sensor for receiving an input from a user; and one or more computer devices associated with the keyboard and/or connected to the keyboard, the computer devices comprising one or more processors for: determining an operation associated with the input; determining an input parameter associated with the operation; and altering an operation parameter associated with the operation in dependence on the input parameter.

According to another aspect of the present disclosure, there is described a system comprising: a keyboard comprising a backlight and a touch sensor, wherein the backlight is arranged to emit light; and one or more computer devices associated with the keyboard and/or connected to the keyboard, the computer devices comprising one or more processors for: controlling the backlight so as to control the emission of the light in dependence on a feature of the touch sensor.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

Where the disclosure references the keyboard being arranged to operate in a certain way, this may comprise the control unit being arranged to operate in a certain way (and vice versa).

As used herein, a touch of the user may refer to a touch of the user using an appendage of the user (e.g. a finger). Equally, a touch of the user may refer to a touch of the user using an implement, such as a stylus.

The disclosure extends to methods and/or apparatus substantially as herein described with reference to the accompanying drawings.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
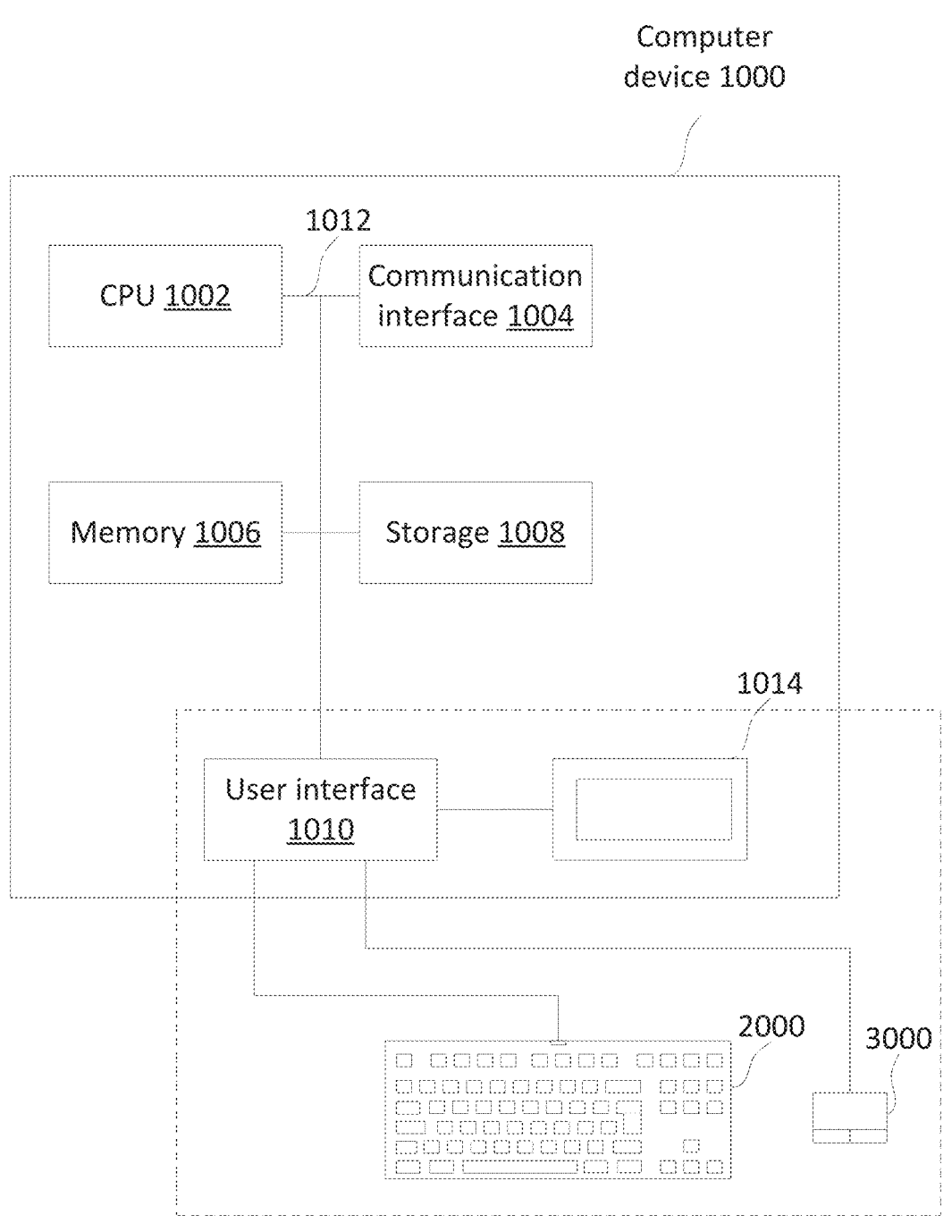
FIG. 1 shows an exemplary user device with which the apparatus described herein may be used.

Referring to FIG. 1, there is shown an exemplary computer device 1000.

The computer device 1000 comprises a processor in the form of a CPU 1002, a communication interface 1004, a memory 1006, storage 1008, and a user interface 1010, where the components are connected by a bus 1012. The user interface 1010 typically comprises a display 1016 and one or more input/output devices; in this embodiment the user interface 1010 comprises a keyboard 2000 and a pointer input 3000.

The CPU 1002 executes instructions, including instructions stored in the memory 1006 and the storage 1008.

The communication interface 1004 is typically a Bluetooth® interface that enables the computer device 1000 to be coupled with other devices comprising a Bluetooth® interface. It will be appreciated that the communication interface 1004 may comprise any other communications technology, such as an area network interface and/or an Ethernet interface. The communication interface 1004 may comprise a wireless interface or a wired interface, such as a universal serial bus (USB) interface.

The memory 1006 stores instructions and other information for use by the CPU 1002. Typically, the memory usually comprises both Random Access Memory (RAM) and Read Only Memory (ROM).

The storage 1008 provides mass storage for the computer device 1000. Depending on the computer device, the storage is typically an integral storage device in the form of a hard disk device, a flash memory or some other similar solid state memory device, or an array of such devices.

The user interface 1012, and in particular the keyboard 2000 and the pointer input 3000 are used to control the computer device 1000, where these components enable the user to pass instructions to the CPU 1002. Typically, the pointer input comprises a touch sensor and/or a computer mouse.

The keyboard 2000 and the pointer input 3000 may be integrated with the computer device 1000 or may be removable components. For example, the keyboard and the pointer input may be connected to the computer device 1000 by an, optionally removable, wire, such as a USB connection. The pointer input may comprise a touchpad.

In some embodiments, the keyboard 2000 and/or the pointer input 3000 is wirelessly connected to the computer device 1000, for example using a Bluetooth® connection.

The present disclosure relates, in part, to a combined keyboard and pointer input, where a pointer input means (e.g. a touchpad) is integrated with the keyboard 2000. As an example, a capacitive sensor may be integrated with the keyboard, where the capacitive sensor detects when the user touches the keys of the keyboard.

It will be appreciated that as well as capacitive sensors other technologies can be used to detect a user touching the keys of the keyboard 2000. As an example, optical sensors may be used, where these optical sensors may detect movement of an object a certain distance from the keyboard and/or the pointer input 3000. Similarly, pressure sensors may be used, where the pressure sensors may be included in the keys of the keyboard or placed above/below the keys. In various embodiments, the touch sensor comprises one or more of: a camera; acoustic sensors; temperature sensors; magnetic sensors (e.g. Hall sensors); piezoelectric sensors; and triboelectric sensors.

Figure 2:
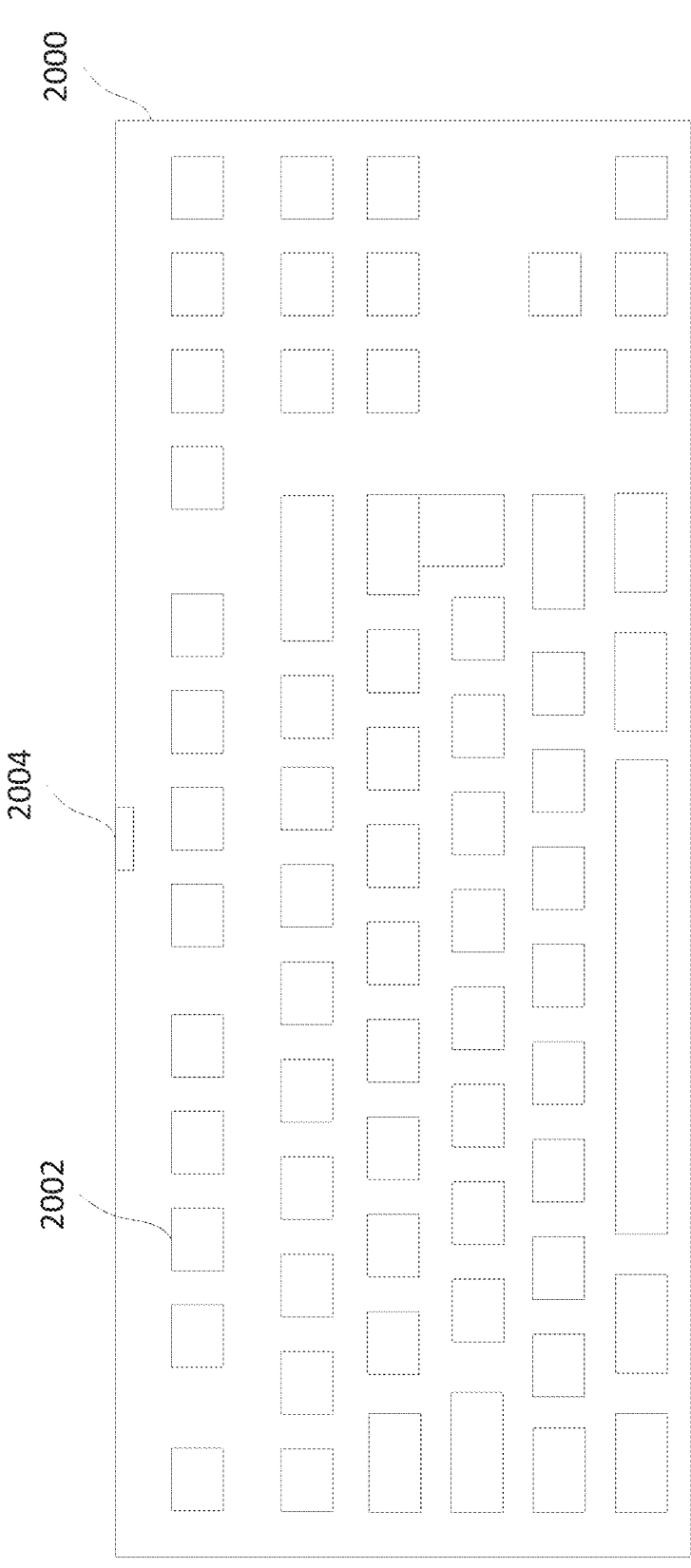
FIG. 2 shows a keyboard.

Referring to FIG. 2, the keyboard 2000 is shown in more detail.

The keyboard 2000 comprises a number of keys 2002 and a connection interface 2004. The keys are arranged to detect a user input, e.g. from a user pressing the keys. The connection interface is arranged to connect the keyboard to the computer device 1000. The connection interface may comprise a USB connection, a Bluetooth® interface, or a radio interface (e.g. at 2.4 GHz or 5 GHz).

In some embodiments, the keyboard 2000 comprises a computer device and/or comprises components similar to the computer device 1000. In particular, the keyboard may comprise a processor, a communication interface, a memory, storage, and/or a user interface. This enables the keyboard to execute instructions itself (without requiring the assistance of a separate computer device).

It will be appreciated that any layout of keyboard may be used; for example, a full-size keyboard, a 'tenkeyless' keyboard, or a '60%' keyboard. Furthermore, the layout and properties of the keys 2002 on the keyboard 2000 may vary.

Figure 3:
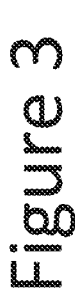
FIG. 3 shows layers of the keyboard.

Referring to FIG. 3, the keyboard 2000 is typically composed of a plurality of layers.

Certain layers that may form a part of the keyboard 2000 are described with reference to FIGS. 4 and 5*a*-5*d*.

Figure 4:
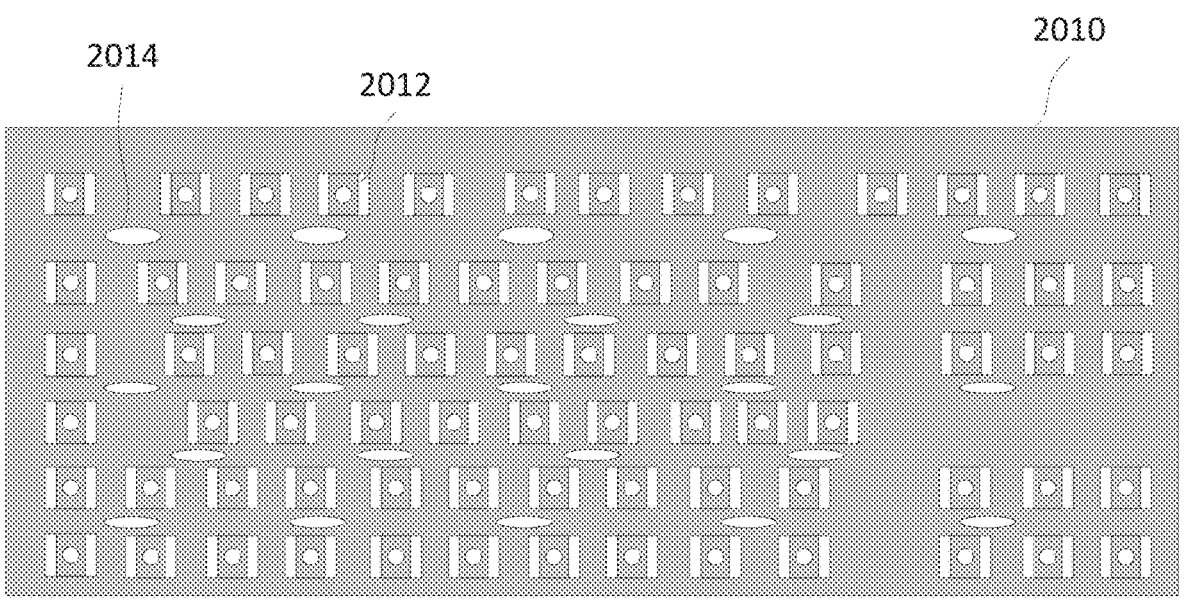
FIG. 4 shows a base plate that may be included in the keyboard.

In particular, referring to FIG. 4, there is disclosed a base plate 2010, which comprises a plurality of hook mounts 2012. The hook mounts of the base plate are arranged to pass through each other layer of the keyboard in order to attach to a keypress mechanism, such as a scissor mechanism. Various other keypress mechanisms are known in the art (e.g. a number of alternate keypress mechanisms are described in WO 2021/094600 A1).

The keyboard 2000 may also comprise a touch sensor (which touch sensor is typically a part of a touch sensor layer); this touch sensor is typically arranged to allow passage of the hook mounts 2012, e.g. by the touch sensor comprising holes through which the hook mounts can pass.

The hook mounts 2012 typically comprise extensions, which are designed to pass through the other layers in order to fit inside recesses of another layer. Alternatively, the hook mounts may comprise recesses, into which extensions of another layer are arranged to fit.

In some embodiments, the base plate 2010 comprises holes 2014 to allow the passage of light. This allows a backlight to be located behind the base plate, where this backlight is able to provide a light that passes through the holes of the base plate.

The base plate 2010 is typically a rigid structure that is typically formed of metal; this provides rigidity to the entire keyboard 2000.

Referring to FIGS. 5*a*-5*d*, there are described other layers that may form a part of the keyboard 2000.

Figure 5A:
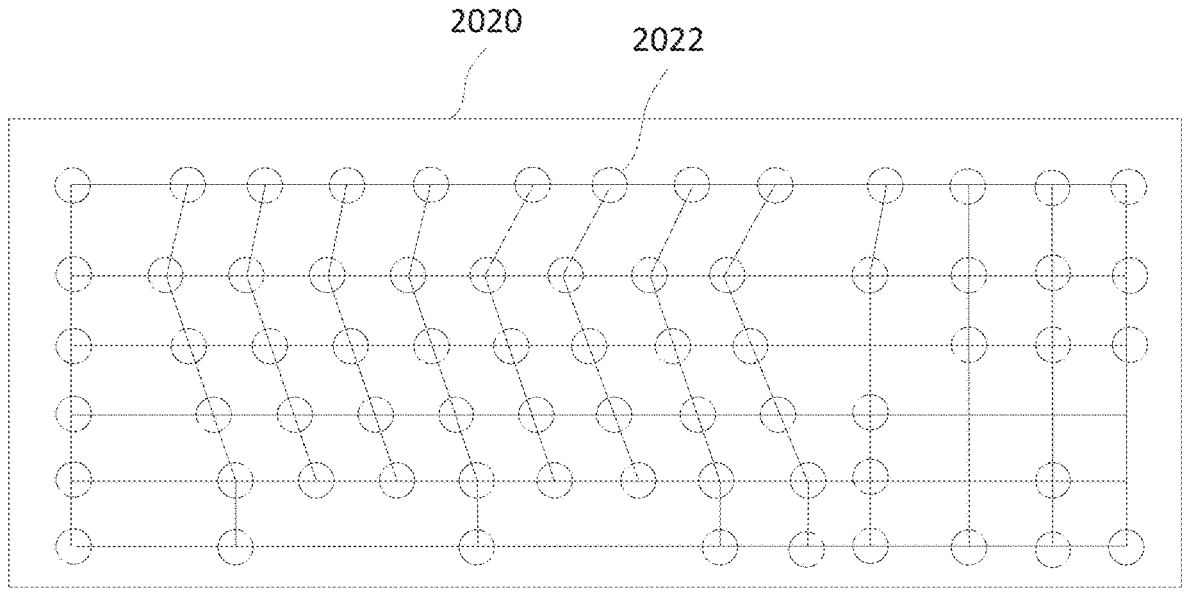
FIGS. 5*a*-5*d* show further layers of the keyboard that may be included in the keyboard.

Referring to FIG. 5*a*, there is shown a keypress sensor layer 2020. The keypress sensor layer is arranged to record keystrokes, e.g. when a user presses one of the keys 2002. Typically, this recording is achieved by arranging a plurality of sensors 2022 on the keypress sensor layer, where each sensor is arranged to detect the pressing of a single key.

In some embodiments, the keyboard 2000 is a membrane keyboard. In such embodiments, the keypress sensor layer 2020 comprises a series of conductive portions with there being two conductive portions between each key. A further conductive portion is present at the base of the keys, so that when a key is pressed two conductive portions of the keyboard sensor layer are connected.

In order to determine a keypress, the keyboard 2000 typically comprises a control unit (not shown) that continuously scans the keypress sensor layer 2020 in order to determine the presence of a current. In various embodiments, the scan rate and the scan pattern of the controller differ; e.g. a higher scan rate of the controller may be desirable to reduce the latency of a keypress, but this may reduce accuracy by being more likely to pick up a false keypress.

In some embodiments, the keyboard 2000 is a mechanical keyboard and each key is connected to a separate switch. Pressing a key operates the corresponding switch, thereby a keypress can be detected.

Typically, the keyboard 2000 is a membrane keyboard and the keypress sensor layer 2020 is formed by bonding together one or more polyethylene terephthalate (PET) membranes. The plurality of keypress sensors (e.g. conductive portions) are located within the PET membranes.

Figure 5B:
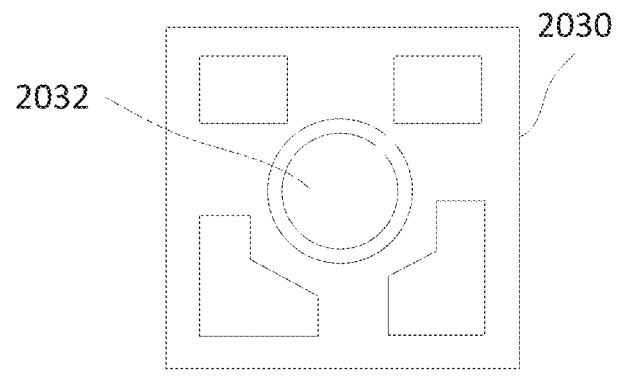
Figure 5C:
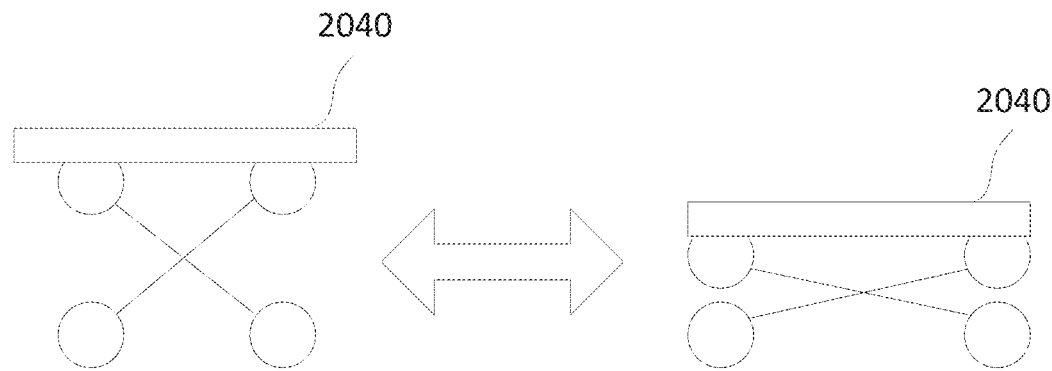
Figure 5D:
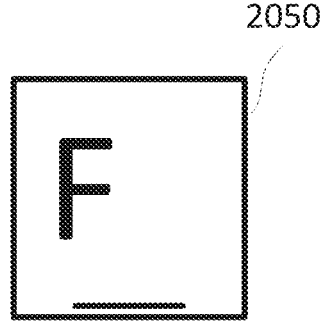

Referring to FIGS. 5*b*-5*d*, each key 2002 typically comprises a transmittal mechanism 2030, a keypress mechanism 2040, and a keycap 2050. The keycap enables the user to interact with the remainder of the key; the transmittal mechanism enables the keycap to interact with the keypress sensor layer 2020 so that a keypress can be detected; the keypress mechanism is an optional feature of the key that is arranged to provide a stable keypress (e.g. ensure that the force resisting a keypress is relatively constant throughout the distance of travel of the key).

The keypress mechanism 2040 also maintains the horizontal position of the keycap 2050 throughout the travel of the key to ensure that the keycap being pressed (at any location on the keycap) results in a depression of the transmittal mechanism 2030.

Typically, the transmittal mechanisms 2030 are mounted on the touch sensor layer 2020. In some embodiments, the transmittal mechanisms are arranged so that the depression of a keycap results in a part of a corresponding transmittal mechanism impacting the touch sensor layer 2020. In some embodiments, the transmittal mechanisms are arranged so that the depression of the keycap 2050 results in a part of a corresponding transmittal mechanism passing through a hole of the touch sensor layer.

Referring to FIG. 5*b*, there is shown an embodiment of a transmittal mechanisms 2030. In this embodiment, the transmittal mechanism comprises a silicone dome 2032, where there is typically a transmittal mechanism (a silicone dome) associated with each key of the keyboard 2000. The silicone domes are arranged so that when the user presses a key of the keyboard 2000 a corresponding silicone dome is compressed, and this dome actuates a sensor 2022 of the keypress sensor layer 2020. The sensor is thus able to detect that a key has been pressed. The transmittal mechanisms (e.g. the silicone domes) also cushion the depression of the keys 2002 and provide a return force that raises a key once the user has released pressure on that key.

It will be appreciated that there are a number of other types of transmittal mechanisms may be used to detect the depression of a key, such as metal domes or mechanical linkages (e.g. push switches and/or springs).

Referring to FIG. 5*c*, there is shown an embodiment of the keypress mechanism 2040, in this embodiment of the keypress mechanism is a scissor mechanism. The scissor mechanism comprises two interlocking parts that are typically composed of plastic. The interlocking parts are arranged to bias the key 2002 towards a raised position and/or to resist the depression of the key. When the user applies pressure to the key, the key is depressed, which forces the base of each interlocking part away from the base of the other interlocking part so that the key can be depressed. When the user releases the pressure, the biasing force acts to raise the key. This movement is shown in FIG. 5*c*.

Referring to FIG. 5*d*, there is shown a keycap 2050. The keycap is placed on top of the transmittal mechanism and the keypress mechanism 2040 so that pressure applied to the keycap is transmitted to the transmittal mechanism 2030 and the keypress mechanism. The keycap protects the remainder of the layers to minimise wear and increase the lifespan and usability of the keyboard 2000. Typically, each keycap has a different symbol printed onto it, e.g. a letter or a number, to enable the user to determine the consequence of depressing the keycap (e.g. depressing a keycap that has "F" printed on it will result in the letter f being typed and shown on the display 1012).

The keypress mechanisms 2040 are mounted on a layer of the keyboard 2000, which may be a separate layer to those described above. In typical keyboards the keypress mechanisms are mounted to a layer that is located towards the top of the keyboard, e.g. the keypress mechanisms may be mounted to a layer immediately below the level of the keycaps 2050.

The present disclosure considers, in part, a keyboard in which the hook mounts 2012 on which the keypress mechanisms 2040 are mounted are a part of the base plate 2010. Each other layer of the keyboard 2000 is arranged so that the hook mounts are able to pass through these layers in order to attach to the keypress mechanisms; in particular, a touch sensor layer is arranged to enable the passage of the hook mounts. The base plate 2010 therefore provides both rigidity for the keyboard and a mounting means for the keypress mechanisms. This enables each keypress mechanism to be secured without the need for a separate securing layer, which allows the provision of a thin keyboard.

Touch Sensor

Figure 6A:
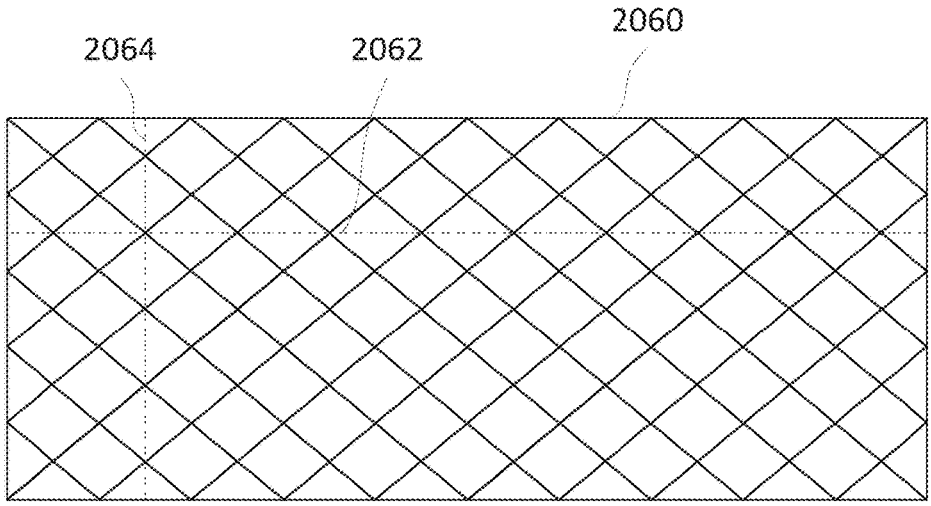
FIG. 6*a* shows a touch sensor that can be used with the keyboard.

Referring to FIG. 6*a*, there is shown a touch sensor in the form of a touch sensor layer 2060 that is suitable for inclusion within the keyboard 2000. The touch sensor layer is arranged to detect the presence of an object on or above the keyboard. Typically, this detection is achieved by the touch sensor layer comprising a plurality of sensing elements. In this embodiment, the touch sensor layer comprises a capacitive sensor that is capable of detecting a user's finger touching the keyboard due to a change in the local electric field caused by the finger. Typically, the touch sensor layer is arranged to determine one or more of: a number of objects above the keyboard, a position of those objects, a motion of those objects, a trajectory of those objects, and/or a speed of those objects.

Figure 8:
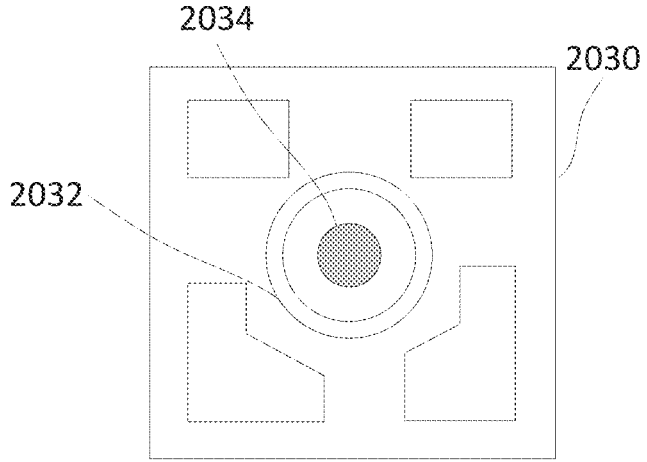
FIG. 8 shows a transmittal mechanism for use in detecting a keypress.

In some embodiments, the touch sensor layer 2060 comprises other sensors, such as optical sensors, pressure sensors, accelerometers, or audio sensors. Generally, the touch sensor layer may comprise any sensor and/or component that is capable of detecting the position and/or movement of a user and/or object.

Where a capacitive sensor is used the capacitive sensor typically comprises a grid formed of rows 2062 and columns 2064 of electrodes. A controller is arranged to drive a current through a single row of the touch sensor layer 2060 and then to scan (in order) each column of the touch sensor layer for an induced current; this process is repeated for each row. The current induced in a given column will depend on whether a user (e.g. a user's finger) is near the row being driven. With a mutual capacitance sensor, the capacitance value at each intersection can be evaluated separately so that the sensing of multiple touch points is possible. Other capacitive sensors, such as self-capacitance sensors, may also be used— for some of these sensors, detection of multiple touch points may not be possible. A more detailed view of a capacitive touch sensor is described below with reference to FIGS. 8a-8c. More generally, any grid of sensor elements may be used to detect a touch input, e.g. a grid of pressure sensors or optical elements may be used.

In this embodiment, there is provided a capacitive sensor with rows and columns arranged in a diamond formation as shown in FIG. 6a, where the separations between the rows 2062 and the columns 2064 of the capacitive sensor are at an angle compared to the edges of the keyboard 2000. Other arrangements may be used, e.g. a comb arrangement where the separations between the rows and columns of electrodes are parallel to the edges of the keyboard.

In order to sense the presence of an object, the touch sensor layer 2060 may be located near the top of the keyboard, e.g. immediately beneath the keypress mechanisms 2040 or the transmittal mechanisms 2030. Proximity to the keycaps 2050 enables simple sensing of a user's touch on the keycaps. In order to amplify the capacitive effect of the user's touch on the keycaps, there may be provided a conductive material on the keycaps or an electrical connection between the keycaps and the touch sensor layer. The use of a conductive material may be particularly beneficial when the touch sensor layer is distant from the keycaps.

Typically, the touch sensor layer 2060 is located above the keypress sensor layer 2020 and below the level of the keypress mechanisms 2040; this arrangement places the touch sensor layer close enough to the top of the keyboard 2000 to detect the touch of a user on the keycaps 2050 of the keyboard while enabling the touch sensor layer to be provided as a single plate (since the touch sensor layer does not need to move due to a movement of the keycaps. More generally, the touch sensor layer is typically located below the layer of the keypress mechanisms so as to allow provision of the touch sensor layer as a single plate.

In some embodiments, the touch sensor layer 2060 comprises holes that enable the passage of the hook mounts 2012 of the base plate 2010; this enables the hook mounts (or a component that can be secured to the hook mounts) to pass through the touch sensor layer so that the keypress mechanisms 2040 can be secured to the hook mounts.

Where the touch sensor layer 2060 is provided above the keypress sensor layer 2020, the keypress sensor layer may be arranged to detect the depression of the transmittal mechanisms 2030 through the touch sensor layer. As an example, the depression of the transmittal mechanisms may apply a pressure to the touch sensor layer that results in the depression of the portion of the touch sensor layer directly beneath the pressed key; this depression of the touch sensor layer is detected by a sensor 2022 of the keypress sensor layer.

In some embodiments, there are provided holes in the touch sensor layer 2060 to enable the transmittal mechanisms 2030 (or a part of the transmittal mechanisms) to pass through the touch sensor layer so as to actuate the sensors 2022 of the keypress sensor layer 2020.

The holes in the touch sensor layer 2060 are typically arranged so that they do not overlap with any intersections of the rows 2062 and columns 2064 of electrodes of the touch sensor layer. For example, the touch sensor layer may comprise one or more holes located entirely between the diagonal separation lines of electrodes of the touch sensor layer. This is described in more detail below with reference to FIGS. 8a-8c.

Figure 6B:
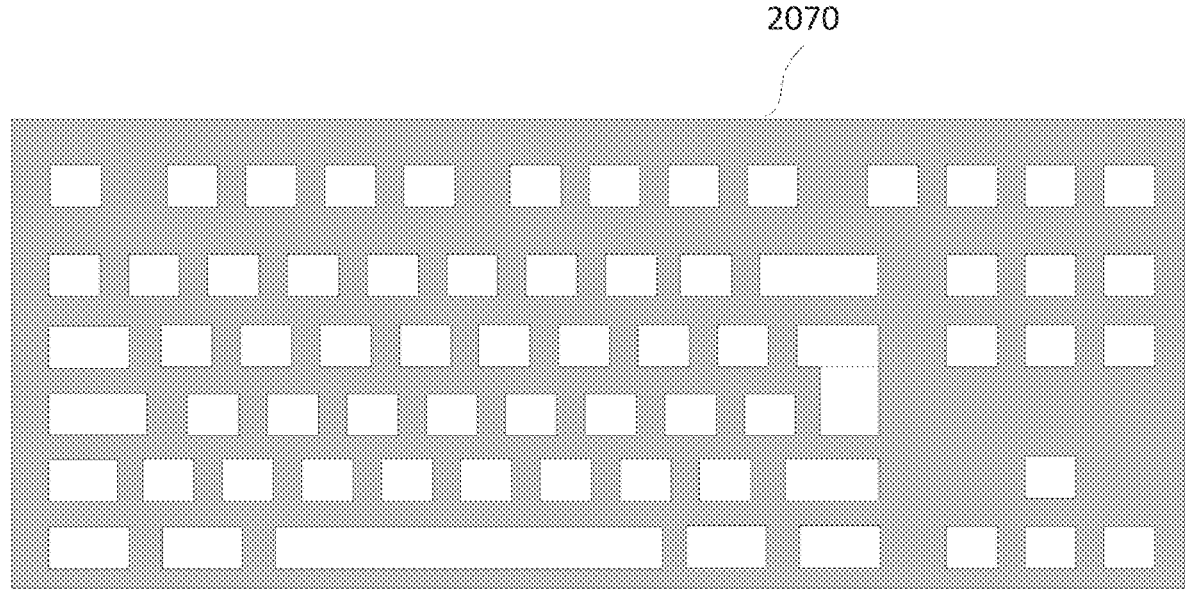
FIG. 6*b* shows a protective layer for protecting the touch sensor of FIG. 6*a*.

Referring to FIG. 6b, where the touch sensor layer 2060 is provided, a protective layer 2070 may be provided to protect the touch sensor layer from dust and moisture. The protective layer is typically made of a plastic material and/or a thin film.

The protective layer 2070 is typically located above the touch sensor layer 2060. Like the touch sensor layer, the protective layer may comprise holes so as to allow the passage of transmittal mechanisms 2030. The keypress mechanisms 2040 may then be mounted on the protective layer. In this situation, the touch sensor layer and the protective layer may be considered to be a single combined touch sensor/touch sensor layer (so that the transmittal mechanisms being mounted on the protective layer effectively involves the transmittal mechanisms being mounted on a touch sensor).

More generally, each layer of the keyboard 2000, and/or each layer between the base layer 2010 and the keypress mechanisms 2040 may comprise holes. Typically, each layer comprises concentric holes so that the hook mounts 2012 (or a light from a backlight) can pass through each layer.

In some embodiments, a backlight is provided so that a user can easily use the keyboard 2000 without an external light source. In these embodiments, there is typically a light guide layer (not shown) included in the keyboard, which light guide layer directs the lights to pass through the keycaps 2050 of the keyboard. In these embodiments, the protective layer 2070 may be transparent or comprise transparent portions.

Typically, the light guide layer and/or the optical elements that provide light for the backlight are placed either at the base of the keyboard (beneath the base plate 2010); above the touch sensor layer 2060; in or on the touch sensor layer (e.g. so that the backlight is integrated with the touch sensor/touch sensor layer); or above the protective layer 2070.

Each layer is typically secured to the other layers with an adhesive layer, e.g. a layer of glue or an adhesive tape (e.g.

a double sided adhesive tape). Securing the layers together ensures that the rigid base plate 2010 is able to provide rigidity to the remainder of the layers.

The hook mounts 2012 are arranged to pass through the touch sensor layer 2060 and the protective layer 2070 in order to secure the keypress mechanisms 2040; this also provides rigidity to the intervening layers.

While it will be appreciated that the layers of the keyboard 2000 may be arranged in any order—and any combination of layers may be provided and/or removed—a preferred arrangement of the layers is as follows:

1. (optionally) The light guide layer (not shown).
2. The base plate 2010.
3. (optionally) A layer of adhesive.
4. The keypress sensor layer 2020.
5. (optionally) A layer of adhesive.
6. The touch sensor layer 2060.
7. (optionally) A layer of adhesive.
8. (optionally) The protective layer 2070.
9. The transmittal mechanisms 2030.
10. The keypress mechanisms 2040.
11. The keycaps 2050.

As has been described above, typically the base layer 2010 comprises hook mounts 2012 that pass through each of the layers between the base plate and the keypress mechanisms 2040 (including the touch sensor layer 2060).

As has been described above, the transmittal mechanisms 2030 may be arranged to pass through the other layers so as to be able to actuate the sensors 2022 of the keypress sensor layer 2020.

Furthermore, the transmittal mechanisms 2030 may pass through, or be located internally to, the keypress mechanisms 2040, so that the keypress mechanisms are effectively adjacent to the protective layer 2070.

Typically, the transmittal mechanisms 2030 (e.g. silicone domes) are mounted on the touch sensor layer 2060, where the depression of the transmittal mechanism may result in a part of the transmittal mechanism passing through a hole of the touch sensor layer.

Typically, a ground layer is located between the keypress sensor layer 2020 and the touch sensor layer 2060; for example, directly above the keypress sensor layer. This ground layer is arranged to prevent interference between the keypress sensor layer and the touch sensor layer.

There is disclosed herein a method of detecting keypresses using the touch sensor layer 2060. In these embodiments, the keyboard 2000 may be provided without the keypress sensor layer.

In these embodiments, and other embodiments, the keyboard 2000 may be provided without the base plate 2010. Where the keyboard is provided without the base plate in particular (but also where the keyboard has the base plate), the touch sensor layer 2060 may be provided as a rigid layer that provides rigidity to the keyboard; for example, the touch sensor layer may comprise an FR4 material.

In some embodiments, the keyboard 2000 comprises (optionally, only):

1. A touch sensor layer 2060, which may also be used to detect keypresses, as is described further below.
2. Keycaps 2050.

In such embodiments, the keycaps 2050 may perform certain functions of the transmittal mechanisms 2030 and the protective layer 2070 (e.g. the operation of the touch sensors). Typically, such embodiments further comprise keypress mechanisms 2040 between the touch sensor layer 2060 and the keycaps. As is described further below, these keypress mechanisms 2040 may also provide some of the functionality that is conventionally provided by the transmittal mechanisms.

In these embodiments in particular, the keycaps 2050 may each be associated with (e.g. comprise) a conductive and/or metal element. In particular, there may be a metal coating arranged on or in the keycaps (e.g. embedded in layers of silicon). In a preferred embodiment, there are metal elements (e.g. embedded in layers of silicon) located on each corner of some or all of the keycaps. This aids in the detection of a keypress by the keypress sensor layer 2020 (where a keypress sensor layer is used) and/or the touch sensor layer 2060 (as is described further below).

Where a keypress sensor layer 2020 is provided, this layer may be provided in combination with the touch sensor layer 2060 (e.g. in a combined printed circuit board (PCB) layer).

As has been explained with reference to FIG. 5a, keypresses can be detected using a keypress sensor layer that contains a number of sensors to detect the pressing of a key.

An aspect of the present disclosure relates to instead (or additionally) determining keypresses using the touch sensor layer 2060. In particular, where the touch sensor layer 2060 comprises a capacitive sensor, the transmittal mechanism 2030 may be arranged so that pressing the key 2002 results in a change in the local electric field near the touch sensor layer.

Figure 9:
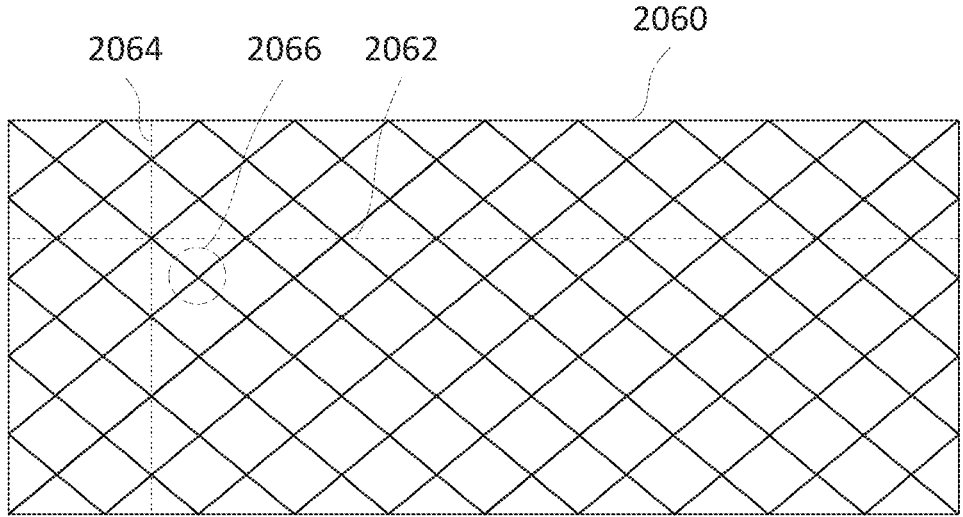
FIG. 9 shows a capacitive sensor suitable for use with the transmittal mechanism of FIG. 8.

As shown in FIG. 9, one way of implementing, or assisting, this determining is by attaching a coating 2034, e.g. a metal coating, to the transmittal mechanisms 2030 and/or the base of the keys 2002 so that when a key is pressed a corresponding coating approaches and/or contacts an electrode of the touch sensor layer 2060. This presence of the coating results in a determinable alteration of the local electric field beneath the pressed key. This alteration can be detected using the touch sensor layer.

In various embodiments, the coating 2034 comprises one or more of: a metal coating, an electrically conductive coating, a metal oxide semiconductor coating, and an electrically insulating coating. Typically, the coating is arranged to cause a greater alteration to the local electric filed than the presence of a user's finger alone (e.g. an alteration at least twice the alteration due to a user's finger).

The coating 2034 may be located on any component that moves when the keycap 2050 is depressed. Typically, the coating is located on the keycap (e.g. on the underside of the keycap) and/or on the transmittal mechanism 2030 (e.g. on the exterior of the silicone dome 2032 or on the interior of the silicone dome). In other words, the coating 2034 is arranged so that the coating is moved when the keycap is pressed.

In order to increase the sensitivity of the touch sensor layer 2060 and improve the detection of keypresses, in some embodiments the touch sensor layer is arranged so that the coating 2034 on the transmittal mechanism 2030 is located above an intersection of the rows and columns of the touch sensor layer. This is illustrated in FIG. 9, which shows an exemplary contact point 2066 (or a nearest approach point) on the touch sensor layer 2060. This contact point is arranged to be located beneath the coating of a key 2002 of the keyboard 2000 so that when the key is depressed, the coating approaches the contact point.

In some embodiments, the transmittal mechanism 2030 and/or the coating 2034 is located above the centre of a sensor of the touch sensor layer 2060 (e.g. to be at the centre of an electrode). In some embodiments, the transmittal mechanism and/or the coating of one or more keys is arranged to be at the intersection of a row of electrodes and a column of electrodes (e.g. the point at which the necks of two electrodes overlap).

By using the touch sensor layer 2060 to detect keypresses, the keyboard 2000 can be provided without the (separate) keypress sensor layer 2020. This enables the provision of a thin keyboard that is useable both for typing and as a touchpad. This also enables the provision of the touch sensor layer without holes to enable the passage of the transmittal mechanisms 2030. The lack of a need to provide holes in the touch sensor layer can simplify manufacture of the touch sensor layer.

In some embodiments, and in particular in embodiments where keypresses are detected using the touch sensor layer 2060, the touch sensor layer comprises optical elements (e.g. LEDs) arranged to provide a backlight. Where keypresses are detected using the touch sensor layer, holes in the touch sensor layer for the transmittal mechanisms 2030 are not required; the optical elements may then replace these holes (e.g. so that the optical elements do not overlap with any edges of touch sensor elements). More generally, optical elements may be located on the touch sensor layer based on the same sets of conditions for the placing of the holes. There may be provided a touch sensor layer that comprises both holes and optical elements, wherein the locating of the optical elements and the holes is based on the same sets of conditions.

While the detection of a keypress has been described with reference to a capacitive touch sensor, it will be appreciated that such detection is possible with other sensing mechanisms. As an example, a pressure sensor may be used to detect both touches and keypresses, where a light pressure placed on the keys 2002 is indicative of a user providing a touch/pointer input and a heavy pressure placed on the keys (e.g. a keypress) is indicative of a keystroke input.

Exemplary keyboard constructions where the touch sensor layer 2060 is used to detect keypresses are as follows:
1. The base plate 2010.
2. (optionally) A layer of adhesive.
3. The touch sensor layer 2060.
4. (optionally) The protective layer 2070.
5. The transmittal mechanism 2030.
6. The keypress mechanisms 2040.
7. The keycaps 2050.
and
1. The base plate 2010.
2. (optionally) A layer of adhesive.
3. The touch sensor layer 2060.
4. (optionally) The protective layer 2070.
5. The transmittal mechanism 2030.
6. The keypress mechanism mounting layer (not shown).
7. The keypress mechanisms 2040.
8. The keycaps 2050.

Touch Sensor Layer

The touch sensor layer 2060 may be any layer that is capable of detecting the position of the finger of a user. The touch sensor layer may comprise optical sensors, pressure sensors, self-capacitive sensors, and/or mutual capacitance sensors. While the touch sensor layer is typically described as sensing a touch on the keys of the keyboard 2000, the touch sensor layer may also be arranged to sense an object proximate to the touch sensor layer, where this object may move above the keys 2002 of the keyboard.

Figure 7:
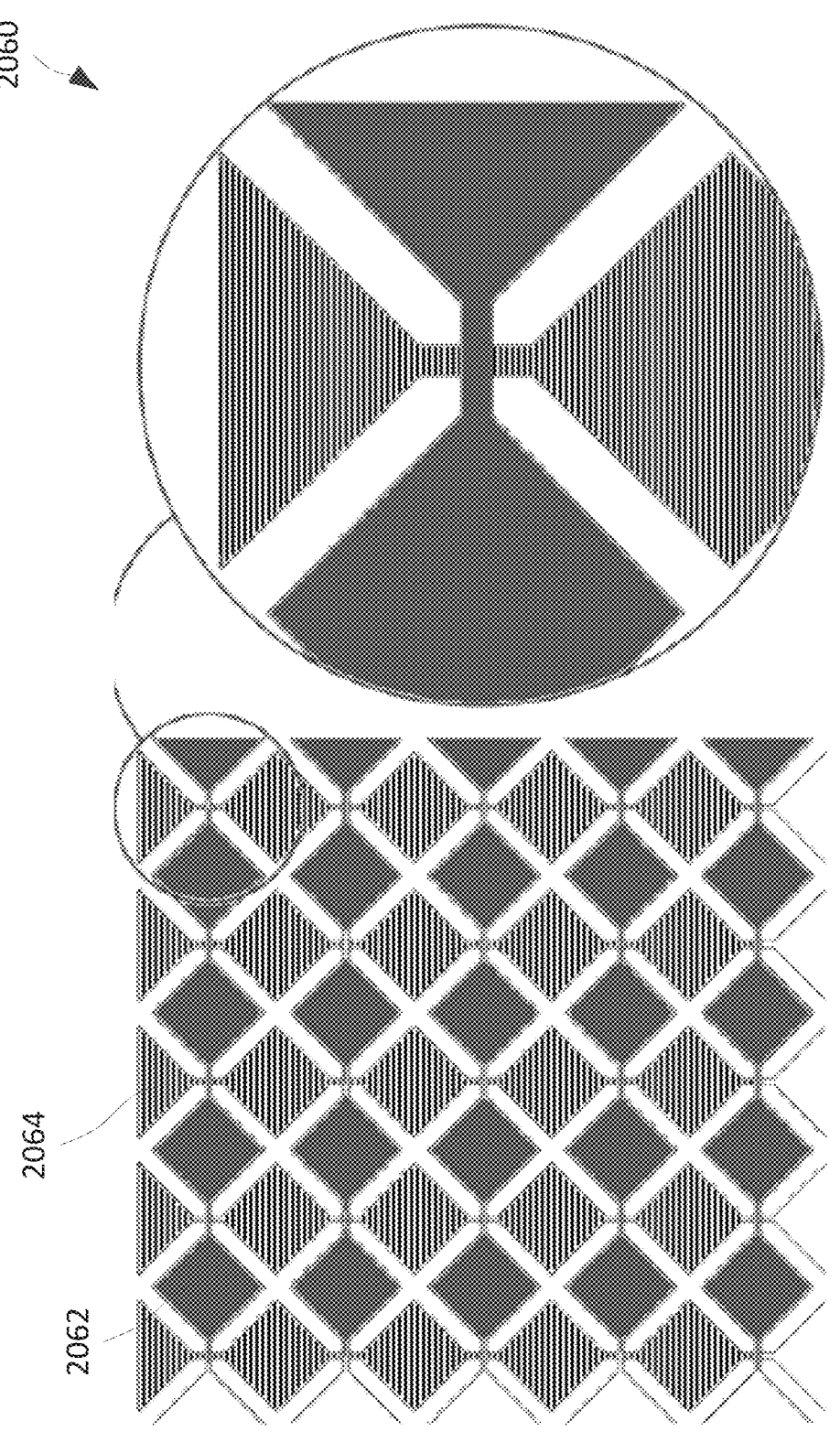
FIG. 7 shows a detailed example of a touch sensor.

As shown in FIG. 6a and, in more detail, in FIG. 7 the touch sensor layer 2060 typically comprises a matrix of electrodes that is used to provide a projected capacitive keyboard.

The 'rows' 2062 of electrodes form a transmitting channel, while the 'columns' 2064 of electrodes form a receiving channel. In order to detect a touch, a control unit (not shown) sends a signal sequentially to each of the rows (so that at any one time only one electrode row is being 'driven'). This results in a signal being induced in the receiving channels/ columns. The touch of a user, or the proximity of a coating 2034, alters the local electric field in the vicinity of the electrodes and thereby alters the signal that is induced in each receiving channel/column. For each pair of rows and columns there will be a single intersection; therefore, by detecting an alteration in the local electric field for a receiving column based on a driven row, it is possible to detect the precise location of a touch or a keypress.

It will be appreciated other arrangements may be used, e.g. where the columns form the transmitting channel of the touch sensor layer 2060 and the rows form the receiving channel of the touch sensor layer.

In order to detect the alteration in the local electric field, it is necessary to calibrate the touch sensor layer 2060 in order to determine a baseline for the induction in each receiving channel (for each transmitting channel). Differences from this baseline measurement can then be detected. In order to calibrate the touch sensor layer, the signal induced in each column 2064 by a signal being sent to each row 2062 is measured in the absence of a user.

It will be appreciated that a change in the local electric field can be caused simply by proximity to the touch sensor layer 2060; it is not necessary for the user or the coating 2034 to directly impact the touch sensor layer.

In order to distinguish between a keypress and the touch of a user, a control unit which receives signals from the touch sensor layer 2060 may:

Determine a direction and/or location of movement-typically, the keys will move substantially perpendicular to the touch sensor layer, so that the detection of a substantial parallel movement is useable to identify a user touch and the detection of a substantial perpendicular movement is useable to identify a keypress. Similarly, the keys 2002 will typically be restrained so that each key has a fixed range and location of motion; in contrast a movement across the keyboard (e.g. a user's touch) is unrestrained. Therefore, a keypress may be identified by identifying a specific location/ direction of movement.

Determine a magnitude of a change in the local electric field (e.g. by measuring a current induced in the receiving channels)—typically, the coating 2034 will cause a different (e.g. greater) change in the local electric field than a human finger.

Determine a rate and/or duration of a change in the local electric field—typically a key is pressed and then released so that the duration of the change in the local electric field may be shorter for a key press than for a finger movement. Similarly, the rate of change of the local electric field may be higher for a key press. Additionally, the depression of a key will result in a change that increases to a peak. The release of a key will cause a decrease in a similar way. This may not be true for a user's touch.

In some embodiments, the coating 2034 is not provided and the touch sensor layer 2060 is nevertheless used to determine a keypress. Such detection may occur based on the considerations above; in particular a movement of a finger directly towards the touch sensor (and below the raised level of the keys 2002) may be interpreted as a keypress, while a movement perpendicular to the touch sensor layer may be interpreted as a touch gesture.

In some embodiments, the control unit of the keyboard 2000 processes signals from the touch sensor layer 2060 in dependence on an input mode of the keyboard. The keyboard 2000 may have a plurality of input modes that can be selected by a user, including a keypress input mode and a pointer input mode. In the keypress input mode, the controller of the touch sensor layer may expect keypresses, and so detect an isolated capacitive change indicative of a keypress as a keypress. In the pointer input mode, the controller of the touch sensor layer may expect a user's touch and so may ignore such an isolated change in capacitance, or interpret this change as a touch gesture instead of a keypress.

In some embodiments, the control unit detects keypresses even in the pointer input mode and uses such keypresses as a signal to change to a keypress input mode. Alternatively, the output of pressing a key may differ between the input modes (e.g. the space bar may enter a space when the keyboard is in the keypress input mode and may simulate a mouseclick when the keyboard is in the touchpad input mode).

Exemplary keyboard input modes, and exemplary methods for switching between these input modes, are described in more depth below as well as in WO 2019/237173 A1.

Backlight

Where the keyboard 2000 comprises a backlight (e.g. a backlight layer), the backlight typically comprises one or more light emitting elements that are associated with one or more keys of the keyboard. Typically, the backlight comprises a light emitting element for each of a plurality of keys of the keyboard, for example, the backlight may comprise a separate light emitting element or a separate group of light emitting elements for each key of the keyboard.

The backlight may be implemented as a single unit of light emitting elements, e.g. as a film that comprises a plurality of light emitting elements. Equally, the backlight may comprise a plurality of separated light emitting elements, where there may be a (separate) light emitting element located beneath one or more of the keys of the keyboard so as to provide a light that is associated with that key.

The backlight may comprise light emitting elements of a single colour. Typically, the backlight comprises a plurality of light emitting elements of different colours and/or comprises light emitting elements that are capable of emitting light of different colours (e.g. RGB LEDs). Typically, the backlight is arranged to emit light of a plurality of colours for a plurality of keys of the keyboard, so that the backlight is, for example, able to emit different colours of light through each key independently.

In order to enable the emission of light through a key, one or more of the keycaps may comprise a transparent or translucent portion. In particular, a text portion (e.g. a character) of the keycaps may be arranged to allow the passage of light. Furthermore, the keycaps may be arranged so that light is able to pass between the keys. Such arrangements enable the emission of light in association with a key. Such a backlight is then useable to provide feedback to a user who is interacting with the keys.

In some embodiments, the backlight comprises different light emitting elements and/or different groups of light emitting elements located under each key. For example, a first group of light emitting elements may be located under a left bottom corner of a key and a second group of light emitting elements may be located under the right top corner of the key. This is of particular use where the keys comprise a plurality of text portions; for example, each key may comprise a first text portion associated with a first language and a second text portion associated with a second language. There may be separate light emitting elements located under each of the text portions so that, for example, the backlight can be used to show a present language of the keyboard. The user may then be able to switch a mode of the keyboard to switch between the languages, where the backlight may update the light being emitted accordingly.

A number of exemplary structures of keyboards have been described above. It will be appreciated that a backlight layer could be combined with any of these structures and that the backlight layer may be included at any location in the keyboard structure. In an exemplary embodiment, the keyboard comprises the layers:

1. The base plate 2010.
2. A backlight (e.g. a backlight layer).
3. The keypress sensor layer 2020.
4. The touch sensor layer 2060.
5. The transmittal mechanisms 2030.
6. (optionally) an adhesive layer.
7. (optionally) a keypress mounting layer.
8. The keypress mechanisms 2040.
9. The keycaps 2050.

It will be appreciated that this structure is purely exemplary and that the present disclosures may be implemented with various structures of keyboard and various placements of the backlight. For example, in some embodiments keypresses are detected using the touch sensor layer and so the keyboard may be provided without the keypress sensor layer.

In some embodiments, the backlight comprises a light guide layer with a set of light emitting elements (e.g. LEDs) arranged around the perimeter of the layer. In some embodiments, the light guide layer comprises a thin film with light emitting elements located underneath one or more (or each) key(s). Various forms of backlight are possible, where the backlight is arranged to emit light through the surface of the keyboard (e.g. between the keycaps and/or through the keycaps).

In an exemplary embodiment, the backlight comprises a thin film with addressable (and/or programmable) RGB light emitting elements located between the base plate 2010 and the keypress sensor layer 2020. The light emitting elements typically enable the control of the colour and/or brightness (intensity) of the light emitted by these elements.

In some embodiments, the backlight is combined with the touch sensor layer 2060 so as to provide a more compact keyboard.

As is described below, the use of a backlight enables improved operation of a keyboard that comprises a touch sensor.

In various embodiments, the keyboard 2000 (e.g. a control unit of the keyboard) is arranged to control the backlight so as to:

Indicate an operation detected by the keyboard (e.g. indicate a gesture detected by the touch sensor or indicate a keypress detected by the touch sensor or the keypress sensor). For example, the backlight may indicate a location of an operation, a type of an operation, and/or a characteristic of an operation.

Indicate a location of an object on the keyboard. The backlight may show, for example, a location of a finger so that as a user moves their finger over the keyboard the backlight indicates a path of the finger (where the location may be associated with a delay). This enables a user to easily see the movements that are being detected by the keyboard and to immediately identify when a movement is being detected inadvertently and/or when a movement is not being detected.

Operate in dependence on whether an operation is a valid operation. In particular, the backlight may be arranged to emit light only when a valid operation is detected (e.g. to indicate the operation that has been performed). Similarly, the backlight may be arranged to emit a first type of light when a valid operation is detected and/or a second type of light when an invalid operation is detected. For example, the backlight may emit a red light and/or a flashing light when an invalid operation is detected and/or the backlight may emit a green light and/or a solid light when a valid operation is detected. Equally, the backlight may only emit light when a valid operation has been detected so as to indicate that this operation has been detected.

The validity of an operation typically depends on a mode of the keyboard and/or a parameter of the operation. For example, touch operations (gestures) may only be valid when the keyboard is in a touch mode. Equally, touch operations may require certain parameters to be valid; a swipe gesture may be detected when a user moves their finger along the keyboard. A first distance of movement may result in a swipe gesture being detected, but there may be a threshold distance (that is greater than this first distance) that is required for the swipe gesture to be valid. The use of such a threshold distance can be used to reduce the probability of a user inadvertently registering a swipe gesture. Similarly, a keypress may be detected when a key has been depressed to a first distance, but the keypress may not be registered as valid until a greater threshold distance has been reached. Where an operation is detected to be invalid, this operation may not be registered (or performed, or output) by the keyboard. That is, for a keypress to be registered by the keyboard and output to an attached computer device, the user may be required to depress a key past the threshold distance; depressing a key to a lesser distance may result in the keyboard determining that a keypress has occurred, but not outputting this keypress.

The keyboard may then emit a type of light to indicate whether a detected operation is valid (e.g. whether an associated parameter has met a threshold parameter requirement), where this emission of light acts as a teaching guide for a user of the keyboard.

Typically, the backlight is arranged to emit light in dependence on a valid gesture and/or keypress being detected. For example, when a valid gesture is detected, a path of the gesture may be shown (e.g. the backlight may light up as a user moves their finger across the keyboard to show the position of the finger and then when a gesture is registered, the relevant portion of a path of the finger may be shown for a short period of time).

The light emitted by the backlight may, for example, indicate a gesture and/or a type of gesture so that, for example, a swipe gesture may result in light being emitted that shows the path of the swipe and a pinch gesture may show the location of a pinch. Equally, a type of light may be emitted that shows that a swipe gesture has been detected (e.g. the backlight may flash a certain colour of light to indicate that a swipe gesture has been detected, and/or different colours of light may be emitted for different gestures).

Operate in dependence on a mode of the keyboard. For example, the backlight may be arranged to emit different types of light in dependence on whether the keyboard is in a touch mode or a typing mode. Therefore, the backlight may emit a green light when the keyboard is in a touch mode and/or when the keyboard detects gestures and/or the backlight may emit a blue light when the keyboard is in a keypress mode and/or when the keyboard detects keypresses.

Different gestures may be valid in different modes so that, for example, a keypress may be a valid gesture when in a typing mode but may be an invalid gesture when in a touch mode. Therefore, the backlight may emit light in dependence on whether an operation is a valid operation, where this depends on a mode of the keyboard. Furthermore, the backlight may be arranged to emit light so as to indicate a change in the mode of the keyboard (e.g. where the backlight emits a type of light that indicates that a change has occurred and/or that indicates a switched-into mode of the keyboard).

In some embodiments, the keyboard comprises a gesture learning mode in which the keyboard is arranged to output different types of lights for different gestures in order to teach a user the parameters required to register various gestures. In such a mode, the keyboard may be arranged to not register operations and/or to not provide an output. This enables a user to learn the parameters without worrying about registering undesired operations.

The backlight may be arranged to indicate that the keyboard is in a learning mode, as is described further below.

Operate in dependence on a user of the keyboard. In particular, the backlight may be arranged to emit light in dependence on an experience of a user and/or a history of a user. In particular, this enables the backlight to be used to help to teach a user of the keyboard the operations of one or more modes of the keyboard. For example, light may be emitted each time a new user of the keyboard performs a certain gesture so as to teach the user the parameters required for each gesture. Light may be emitted to indicate a swipe gesture each time a user makes a valid swipe gesture so that a user is able to see how long of a swipe is required before a swipe gesture is detected. The keyboard may stop showing this light when it determines that a user has learned the gesture (e.g. after a number of successful operations, after an input from the user, and/or after a certain success rate is reached for a particular operation).

Indicate one or more touch areas of the keyboard so as to indicate to a user the locations of these touch areas. For example, the keyboard may be arranged to indicate one or more touch areas in dependence on an input of the user (e.g. in dependence on a particular gesture being detected) or the keyboard may be arranged to indicate these areas in dependence on a change in mode. In some embodiments, the backlight is arranged to emit light so as to indicate a touch area of the keyboard when that area is being used (e.g. when a gesture is detected on the touch area). In some embodiments, the backlight is arranged to indicate one or more touch sliders on the keyboard. These touch sliders may be indicated only when they are in use (e.g. when a user touches the 'F' row, the whole of the 'F' row may be lit with a special color to indicate that an associated touch slider is in use). Different touch sliders (or more generally touch areas) may be associated with different colors or different light animations.

Indicate an area of focus and/or an application of focus. In particular, where a user has a plurality of different applications open, the backlight may emit light so as to indicate which of these applications is presently selected. Therefore, a user is able to immediately determine, for example, whether typing will enter letters into an email or into a word document. Indicating an application of focus may also comprise indicating functionalities, touch areas, and/or possible operations, associated with that application. For example, when an image processing application is in focus, the backlight may indicate a first touch area or group of touch areas and when a word processing application is in focus, the backlight may indicate a second touch area or group of touch areas.

Indicate a connection status of the keyboard. For example, the backlight may be arranged to emit light so as to indicate that the keyboard is connected to a certain device or type of device, e.g. to show whether the keyboard is connected to a PC or a Mac. When the keyboard is switched on it maybe 'breathing' with a blue color, then when a connection to a computer is detected (e.g. by USB or Bluetooth) the backlight may be arranged to emit a green colour). Furthermore, the keyboard may be arranged to emit different colours of light in dependence on whether the keyboard is connected to a PC or a Mac with, for example, a connection to a PC causing the emission of purple light and a connection to a Mac causing the emission of green light.

In some embodiments, a user is able to pair the keyboard with a plurality of different devices, where each device is associated with a different type of light. Therefore, a connection to a first device may cause the emission of a first colour of light, with a connection to a second device causing the emission of a second colour of light.

Indicate a typing position. In particular, the backlight may be arranged to indicate a desirable position of a user's hands while typing so that a user that is learning to touch type is able to obtain feedback from the backlight.

Operate in dependence on a user input. In particular, a user may be able to define one or more of: touch areas; modes; gestures; buttons; sliders; connection devices, and to define a type and/or colour of light that is emitted in dependence on these factors. For example, a user may define a custom touch area and a colour of light that is emitted in association with that touch area. A user may also define a condition for the emission of said light, an action or operation (e.g. a gesture) that triggers the emission of light and/or a change (e.g. a change in a mode) that triggers the emission of light.

Operate in dependence on a status of the keyboard and/or of a connected device. For example, the backlight may indicate whether a device is awake or asleep. Equally, the backlight may indicate a progress of an operation of the device. Therefore, a user may be able to tell, for example, whether an installation process has been completed by viewing the keyboard (and this may be especially useful where the keyboard comprises a wireless communications interface so that it may be moved away from a connected device).

Operate in dependence on an application of a connected device. For example, the backlight may be used to indicate that a user is taking damage during a game, or the backlight may be used to indicate that a user has moved the cursor outside of an editable area during an image processing operation.

Operate so as to provide an instruction to a user and/or to indicate a calibration process. For example, the backlight may indicate that a user should remove their hands from the keyboard so as to enable the keyboard to be calibrated.

Emit light so as to implement an interactive function (e.g. a game). In particular, the keyboard may be arranged so that the light emitted by the keyboard is dependent on a gesture detected by the touch sensor or the keyboard, preferably a gesture (or gestures) detected during a preceding window of time (e.g. in the last ten seconds, the last five seconds, and/or the last second) For example, the backlight may emulate a game of snake, where a user is able to move their finger around the keyboard, with the backlight emitting light to show a 'snake' that follows the finger of the user.

Emit light so as to indicate a possible combination of inputs. For example, when a user presses and holds the control key while in a word processing application, the control key and the keys Z, C, V, and P may each be lit with a certain colour to indicate to a user that these keys (Z, C, V, P) could be combined with the control key to perform a shortcut. The emission of light to indicate this combination of inputs may be based on a user, for example to indicate shortcuts that are commonly used by the user. For example, in some embodiments, the keys X and C may be lit when a clipboard of the application is empty, and the key V may be lit when the clipboard has content to indicate the possibility of pasting this content from the clipboard. Such a combination may also be possible with gestures, where the keyboard is able to operate the backlight so as to indicate a possible gesture that can be combined with a preceding gesture or with a depressed key (e.g. based on a certain key being held down, a line may be illuminated on the keyboard to indicate the possibility of inputting a swipe gesture that will combine with this keypress to register a certain operation).

Indicate a status of one or more keys of the keyboard. For example, a certain colour of light in a certain location may be used to indicate a status of the caps lock key, the num lock key, or the scroll lock key. This enables a user to rapidly identify the status of these keys.

Provide ambient lighting. For example, the backlight may be arranged to provide an 'ambilight' functionality, where a type of ambient light emitted by the keyboard is dependent on an application, a context (e.g. a time of day), and/or a user.

It will be appreciated that the keyboard may control the backlight in dependence on a plurality of the above factors, so that the backlight may emit light in dependence on, for example, both a user and a gesture. The backlight may emit light to indicate the performance of a gesture, where the gesture (e.g. a parameter of the gesture) may be dependent on a user.

In general, the backlight may be arranged to alter an emitted type of light. The type of light emitted may refer to one or more of: a colour of emitted light; a pattern and/or frequency of emitted light (e.g. the backlight may be arranged to emit pulses of light of various frequencies); an intensity of emitted light; a location of emitted light; a shape of emitted light; and/or an animation and/or image formed of the emitted light.

Where the type of light relates to a location of light, the backlight may be arranged to emit light in a location that is associated with one or more touch areas of the keyboard, where the keyboard may have a plurality of different touch areas that enable the input of different gestures.

In some embodiments, a processor of the keyboard 2000 is arranged to control the backlight as has been described above. Equally, the keyboard may be arranged so that a processor of a connected device is useable to control the backlight of the keyboard. Equally, the keyboard or the backlight may be arranged to receive controlling signals from a plurality of devices/locations (e.g. the backlight may be controlled by both of the keyboard and a connected device, where each device controls different aspects of the operation of the keyboard).

In some embodiments, there is provided an application for controlling the backlight and/or an application programming interface (API) for controlling the backlight. It will be appreciated that such an application or API could also be used to control other aspects of the operation of the keyboard (e.g. the changing of modes or the registration of operations).

Typically, a user of the keyboard 2000 is able to customise the operation of the backlight (e.g. to define which gestures should be indicated and/or which colours should be used to indicate various features). This may comprise a user interacting with an application so as to customise aspects of this operation (e.g. to alter the conditions for the emission of light and/or to add or remove scenarios in which light is emitted by the backlight.

Personalisation

In some embodiments, the operation of the keyboard 2000, the touch sensor 2060, and/or the backlight is dependent on a user of the keyboard. In particular, these components may be arranged to operate in dependence on a history of the user and/or in dependence on previous inputs received from the user. This enables the provision of a keyboard that is personalised for a user so as to provide a particularly pleasurable and/or efficient user experience.

For example, different users have different typing habits, for example some users type using all 10 fingers, whereas some users type only using 2 fingers. Similarly, some users make unintentional gestures on a frequent basis when attempting to type, whereas some users make keypresses precisely without making any unintentional gestures.

In order to enable optimal operation of the keyboard 2000 for a range of users, the present disclosure considers a keyboard that is arranged to operate in dependence on operations (e.g. keypresses and/or gestures) associated with a particular user. In order to enable such personalization, the keyboard is typically arranged to identify a user operating the keyboard, e.g. based on a device to which the keyboard is attached, based on a user login, based on an application on a connected device, based on a biometric sensor of the keyboard, and/or based on the operations received from a user and/or the interactions of a user with the keyboard. For example, the keyboard may identify a user based on the resting position of their hands.

The operations detected by the keyboard 2000 (and/or the touch sensor 2060 and/or the keypress sensor 2030) typically comprise touch operations (gestures) and typing operations (keypresses). The keyboard is arranged to register or perform an operation in order to output an associated signal to a connected device. For example, registering a keypress typically involves outputting a signal to a connected device that indicates which key has been pressed. Typically, the keyboard is arranged to detect, or determine, an operation before it is registered. That is, the keyboard may determine that a keypress has been performed but the keyboard may decide not to register (or perform or output) this keypress so that no output is provided to a connected device. Such determination without registering may be useful where, for example, the keyboard is in a touch mode. By still detecting that a keypress has occurred, the keyboard is able to collect and analyse the behaviour of a user.

Equally, an operation may be detected when a first value of a parameter of an input is detected, but may not be registered until a second value of that parameter is detected. For example, a keypress may be detected when a key has been depressed to a first threshold level but the keypress may not be registered (and output to a connected device) until the key has been depressed to a second threshold level. The first threshold level and the second threshold level may be user dependent; where the keyboard determines that a user consistently depresses keys while making gestures, the second threshold level may be set to be substantially further than the first threshold level so as to avoid registering keypresses when they are not intended. However, if the keyboard thereafter determines that the user is often depressing keys past the first threshold level but not to the second threshold level during a typing mode, the keyboard may then decrease this second threshold level to ensure that keypresses are being registered when intended. By detecting keypresses at the first threshold level but not registering the keypresses until the second threshold level the keyboard is able to determine an appropriate value of the second threshold level. It will be appreciated that the use of multiple threshold levels is equally applicable to touch operations. It will also be appreciated that systems could be implemented with multiple threshold levels.

While the above example has discussed the use of multiple threshold levels, it will be appreciated that more generally the keyboard 2000 may implement a first condition (e.g. a first set of parameters) that causes the detection of an operation and a second condition (e.g. a second set of parameters) that causes the registration (e.g. output) of an operation. Typically, the first condition and the second condition are linked, but these conditions may equally be substantially different (e.g. unrelated).

The output of the keyboard 2000 is typically dependent on one or more parameters of an operation performed by a user (e.g. one or more parameters of a gesture or a keypress). For example, the parameters may include one or more of:

A type of an operation (e.g. a touch input and/or a keypress);

a coordinate of an operation;

a distance of one or more operations performed by a user (e.g. a gesture which switches between modes of the keyboard);

a number of fingers used by a user for one or more operations;

a distance of movement of a finger during an operation;

a speed of an operation performed by a user;

a duration of an operation performed by a user;

a direction of an operation performed by a user;

a location of an operation performed by a user (e.g. a key that has been pressed or a number of keys over which a user has moved a finger);

a shape of an operation performed by a user;

a time between (e.g. consecutive) operations performed by a user. This time may be different for different pairs of operations, e.g. for a pinching gesture to register, there may be a time required between any swiping gesture and a pinching gesture; this time may differ from a time required between any tapping gesture and a pinching gesture;

any combination of the above parameters.

Typically, the keyboard 2000 is arranged to determine the parameters of an operation(s) associated with a user over a first period of time and thereafter to alter operation parameters (e.g. threshold parameters) for future operations based on these determined parameters. This enables the keyboard to be personalized for a user.

In a practical example, the keyboard 2000 may detect that a user often makes short accidental swipe gestures while they are typing. The keyboard may then increase the distance required for a swipe gesture to be registered so as to reduce the chance of a swipe gesture accidentally being registered during typing.

As described above, the parameter(s) may comprise coordinates of a touch input and/or a keypress input. In this regard, the keyboard 2000 may identify a set of coordinates relating to a touch input and determine an operation based on these coordinates. The coordinates may be used to determine one of the other parameters mentioned above (e.g. a speed and/or a distance of an input). Equally, the coordinates may be used directly to determine an operation.

The first period of time may be associated with a learning mode of the keyboard 2000. Typically, the keyboard is arranged to register keypresses but to not register gestures while in this learning mode so as to avoid inadvertent registrations of gestures while a user is learning to use the keyboard. This enables a user to initially use the keyboard in a similar manner to a conventional keyboard that does not include a touch sensor. Then, by the time the user is ready to use the touch capabilities of the keyboard, the keyboard is already personalized for the user. Equally, in the learning mode (or in an alternate learning mode) the keyboard may be arranged to register gestures but not keypresses. Equally, in the learning mode the keyboard may be arranged to register all operations. Equally, the learning functionality may be running constantly, e.g. while other modes are active. Therefore, the keyboard can continuously learn from a user's input.

As mentioned above, typically, an initial mode of the keyboard 2000 is a learning mode that is a typing mode (e.g. so that gestures are detected by the touch sensor, but are not registered/output by the keyboard). This enables a new user of the keyboard to use the keyboard in the same manner as a conventional keyboard that does not have a touch sensor. Then, when the user turns on the touch functionality (e.g. by switching from a typing mode to a touch mode and/or by switching to a touch mode for the first time), a touch mode of the keyboard will already be personalized for that user.

Typically, each operation has a set of default operation parameters (e.g. threshold parameters), where the keyboard 2000 is able to alter (e.g. to increase or decrease) these parameters based on the operations performed by a user over the first period of time.

In some embodiments, a processor (e.g. of the keyboard and/or of a device associated with the keyboard) is arranged to alter the parameters of a mode-switching operation in dependence on the previous operations of a user. In this regard, in order to seamlessly change between modes, the keyboard is typically arranged to switch between modes based on mode-switching operations. In some embodiments, there are specific mode switching operations so that, for example, only certain gestures are useable to switch into a touch mode and/or to switch out of a typing mode. In other embodiments, every touch operation may be a mode-switching gesture to switch into a touch mode and/or every keypress operation may be a mode-switching operation to switch into a typing mode. In each embodiment, operations may (or may not) have specific threshold parameters when they are used to switch modes. For example, a swipe operation may require a certain distance of movement to register when the keyboard is in a touch mode and may require a different, larger, distance to register as a mode switching gesture when the keyboard is in a typing mode.

In order to avoid accidental switching between modes, the keyboard may be arranged to alter the parameters of a mode switching operation based on previous inputs of a user. Therefore, a user that makes frequent swiping movements while typing may have a longer required swipe length for mode switching than a user that does not regularly make swiping movements while typing. By altering the parameters of one or more mode-switching gestures, the keyboard is able to prevent inadvertent switching of modes without affecting the operation within a mode. Therefore, for example, a long swipe gesture may be required to switch into a touch mode (where such a gesture may simultaneously switch into the touch mode and output a swiping gesture, e.g. to scroll along a page); once in the touch mode, shorter swipe gestures may be registered by the keyboard.

Figure 10:
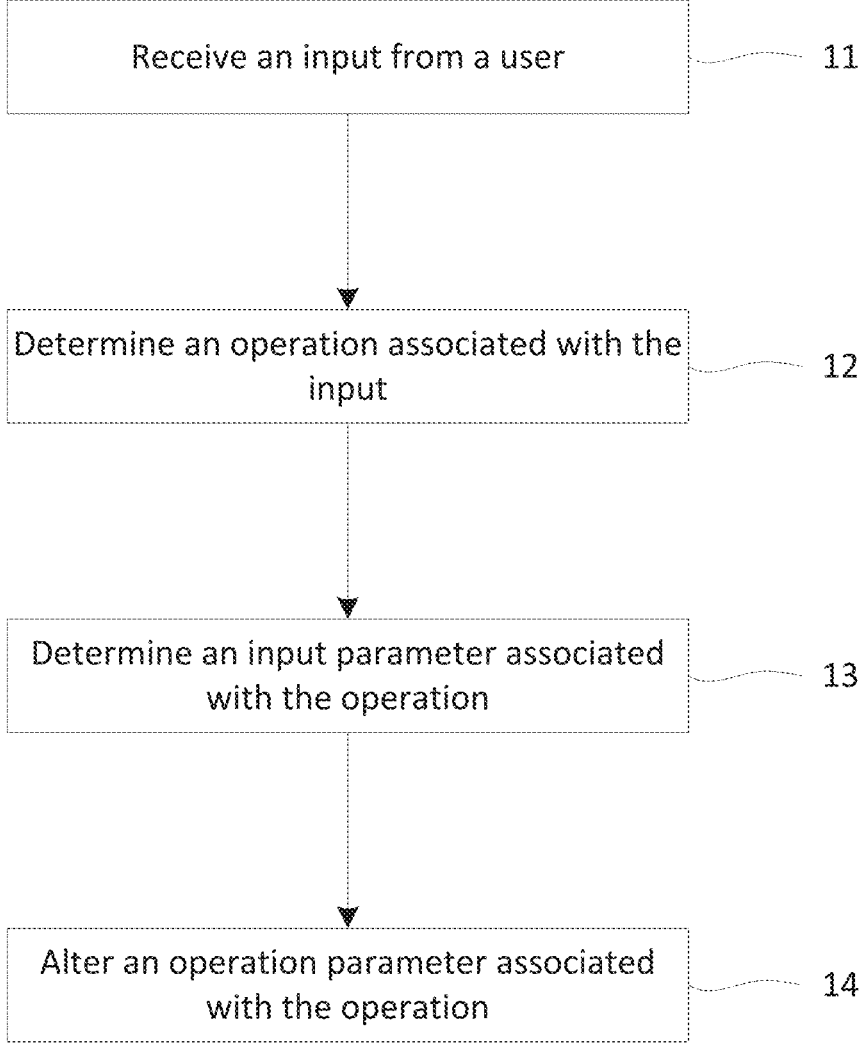
FIG. 10 shows method of altering a parameter associated with an operation of the keyboard.

Referring to FIG. 10, there is shown a method of altering an operation parameter (e.g. a threshold parameter) for an operation based on a previous input (and a previous operation) of a user. The method is typically performed by a processor (e.g. a control unit) of the keyboard and/or a processor of a device associated with, and/or connected to, the keyboard.

In a first step 11, at a first time, the processor receives an input from a user. The input typically relates to an operation, such as a keypress (a typing operation) or a gesture (a touch operation). So the input may comprise a movement of the user, and the input may be received as a signal from the touch sensor that relates to a user moving a finger over the keyboard. Or the input may be received as a signal from the keypress sensor that relates to a user depressing a key of the keyboard.

The processor may be arranged to determine that the input relates to an unintentional and/or inadvertent input or operation. In particular, where the keyboard is in a first mode (e.g. a typing mode), the processor may determine that the input relates to an operation that is associated with a second mode of the keyboard (e.g. a touch mode). The keyboard may determine that the input is an unintentional input based on, for example, the keyboard being in a learning mode.

The alteration of the parameter (as described below) may be dependent on the input being an unintentional input. In such a way, the parameter can be altered to prevent the registration of unintentional inputs (and/or unintentional operations).

In a second step 12, the processor determines an operation associated with the input. Typically, the processor is arranged to determine whether (or that) the operation comprises a gesture and the processor is arranged to determine a type of the gesture. Equally, the processor may determine that the operation comprises a keypress. As an example, the input may comprise a user moving a finger across the keyboard and the processor may then determine that a swipe operation is associated with this input. Equally, the input may involve a user pressing a key, where the processor may then determine that a keypress operation is associated with the input.

In some embodiments, the processor is arranged to determine that an operation that is associated with another mode of the keyboard. For example, the processor may be arranged to detect touch operations when the keyboard is in a typing mode (and the processor may also detect typing operations in this mode). In some embodiments, the processor is arranged to determine a mode switching operation associated with an input.

In some embodiments, the processor is arranged to determine an unintentional operation associated with the input. For example, if the user makes a gesture when they are midway through typing a word or sentence and/or if a user continues to type after making a gesture, the processor may determine that this gesture is unintentional. Similarly, as mentioned above, the processor may determine an unintentional operation based on a present mode of the keyboard or a present activity of a user. The processor may then (as described below) alter a parameter associated with the unintentional gesture to ensure that this gesture is not registered when a similar input is repeated.

In a third step 13, the processor determines an input parameter associated with the operation. Where the operation is a gesture, the processor may determine a coordinate of a touch input associated with the gesture. Equally, the processor may determine a speed, length, number of fingers, etc. associated with the gesture. Where the gesture is a keypress, the processor may determine a location, a speed, a depth, or a direction of the keypress.

It will be appreciated that the second step 12 and/or the third step 13 may be performed in any order. In particular, the keyboard is specifically arranged to determine an operation based on one or more input parameters, so that the input parameters may first be used to determine the operation and then be used (as described below) to alter an operation parameter.

In a fourth step 14, the processor alters an operation parameter associated with the operation. Typically, the operation parameter is related to the parameter required for a valid operation to be detected and/or for an operation to be registered. For example, where the input is determined to relate to a gesture, the processor may alter the speed or length required for a subsequent input of this gesture to be registered.

With such a method, a keyboard can be personalized so as to avoid unintentional operations. Specifically, the parameters required for an operation to be registered may be altered so that, for example, a user that frequently makes unintentional swiping motions while typing does not accidentally register a swiping operation. Equally, the keyboard can be personalized to increase an efficiency of the keyboard. For users that make very precise gestures, the parameters may be altered to enable the registration of an operation based on only a short or quick movement. Therefore, a user that is very precise when typing may be able to make only a short swiping motion to register a swiping operation so that a user can operate the keyboard more quickly and efficiently.

In some embodiments, the above method may be carried out without registering the determined operations. For example, when a user first sets up the keyboard, the keyboard may be arranged to not register some, or all, gestures while the user is in a typing mode. Therefore, to switch into a touch mode, a user may be required to, for example, press a button or make a very specific gesture.

Equally, the method may be implemented while registering operations. Therefore, the keyboard can continuously update the parameters for an operation as the keyboard is used.

The second step 12 of determining an operation may comprise determining that the input relates to a valid operation and/or determining that the input relates to an invalid operation. In an example, a swiping operation (e.g. to scroll along a page) may require a certain distance of movement in order to register as a valid operation. The keyboard may determine that a swiping operation has been performed only when a movement with this threshold distance is detected; equally, the keyboard may determine that a swiping operation has been performed even when a movement without this threshold distance (e.g. as described above, the keyboard may detect a swiping gesture when a swiping movement with a certain distance is detected but may not register this gesture if this distance is beneath a threshold required to register the gesture). Such operation enables the keyboard to reduce the distance required if it is detected that a user is frequently making swiping motions without registering a swiping gesture. For example, if a user regularly makes a first swiping movement that is short of the threshold and then makes a second swiping movement that is greater than the threshold, the keyboard may infer that the first movement was intended to register a swiping gesture and may thereafter reduce the distance threshold.

Therefore, in some embodiments, the keyboard may be arranged to alter (e.g. reduce) an operation parameter (e.g. a threshold parameter) for an operation in dependence on the detection of one or more invalid inputs associated with that operation. Similarly, the keyboard may be arranged to alter an operation parameter based on a ratio of valid inputs to invalid inputs for an operation. For example, the keyboard may be arranged to alter a parameter to obtain a ratio of 95% valid inputs. Altering the parameter to increase the ratio of valid inputs to invalid inputs increases the likelihood of registering an unintentional operation/input, so the ratio may be set to favour the registering of intentional operations or the ratio may be set to favour the ignoring of unintentional operations (and this ratio may depend on a user and/or on a user input).

The aspects of personalization may be combined with the backlight described above. That is, valid gestures may be indicated by the emission of a certain type of light to indicate to a user that a valid gesture has been performed. In the learning mode, these gestures may be shown by the backlight without being registered/output by the keyboard. Therefore, a user is able to learn the parameters associated with a gesture without needing to register operations. The keyboard may comprise a learning mode that is arranged to emit light (e.g. a certain type of light) when a valid operation is detected but to not register this operation (e.g. to not provide an output to a connected device).

In some embodiments, required parameters for a first operation are altered based on parameters determined for a second operation. For example, if a user is determined to often make inadvertent quick swipes across the keyboard while typing, the maximum speed required for a plurality of different touch operations may be reduced even if the detected swipes are not associated with one or more of these different touch operations. This enables a rapid personalization of the keyboard even for gestures that are rarely performed.

The disclosures herein can be used to provide a keyboard with a calibration period, where during this period the keyboard detects the tendencies of a user. The use of the calibration period enables the setting of parameters that avoid inadvertent switching. The calibration period may be associated with a certain duration (e.g. a month, where after this month the calibration period ends) or a certain experience or capability of the user (e.g. the calibration period may end when the user is performing a low number of invalid operations and/or unintentional operations).

The keyboard may be arranged to not register touch inputs/gestures while in a typing mode during the calibration period (where after this initial period touch inputs result in inputs and/or a switch of modes). The keyboard may be arranged to not register keypresses/typing inputs while in a touch mode during the calibration period (where after this initial period keypresses result in inputs and/or a switch of modes).

In some embodiments, the keyboard is arranged to receive a mode locking input from a user, where the mode locking input prevents the performance of operations associated with another mode and prevents the registering of one or more (or all) mode switching operations. As described above, this may be used to lock the keyboard in a typing mode where the keyboard is still able to detect operations associated with a touch mode, but the keyboard does not register actions associated with these operations. This enables a user to type without worrying about inadvertently registering a touch input, which may be of particular benefit for new users of the keyboard. Such a mode locking input may be enabled by default so that a user is required to disable this mode locking input in order to enable modes to be switched using simple mode switching operations. For example, a user is typically able to switch into a typing mode by performing a keypress, but when the mode locking input is active a user may need to interact with an application on a computer device to switch into the typing mode.

As mentioned above, while the mode locking input is active, the keyboard is still able to detect operations input from the users. Therefore, the keyboard is still able to determine and/or alter parameters associated with operations (e.g. of other modes) as has been described above while the mode locking input is active.

In some embodiments, the keyboard is arranged to indicate the operation of the mode locking input; for example, the backlight may be arranged to emit a type of light that depends on the status of the mode locking input.

In some embodiments, the processor is arranged to determine (or wait for) a second operation based on the performance of a first operation. In particular, the processor may determine the performance of a gesture based on a user performing a keypress. The processor may then determine the extent to which this gesture occurs while the user is still performing the keypress. Therefore, the processor may collect coordinates with respective timesteps of fingers when users make a keypress. This enables the processor to determine the extent to which gestures are inadvertently performed during typing. More generally, the processor may determine parameters (e.g. collect coordinates) every time user touches the keyboard or every time the touch sensor detects a change in a local electric field.

In some embodiments, the determination of the operation and/or the alteration of the parameter uses artificial intelligence and/or machine learning. For example, the amount of alteration of the parameter may be determined using a machine learning model where this can be used to enable rapid personalization of the keyboard. Similarly, a machine learning model may be used to determine whether an operation is inadvertent or unintentional. The keyboard may be arranged to transmit (e.g. anonymized) data to a server to assist the training of a machine learning model.

It will be appreciated that a 'threshold parameter' may be any value of parameter that causes the detection and/or registration of an operation. A threshold parameter may be a simple, and/or fixed, value (e.g. a gesture is only registered if it is above a certain speed or distance). Equally, a threshold parameter may be a non-fixed value (e.g. where the required speed depends on another factor, such as another parameter of the operation, or a time of day). The threshold parameter may also be a specific value or range of values (e.g. so that being either below or above this range does not cause the registration of an operation) and/or the threshold parameter may depend on prior actions (e.g. so that a value increasing to a given threshold value causes a registration of a given operation but a value decreasing to this same threshold value does not cause a registration of the operation).

Where a machine learning model is used to detect, evaluate, and/or register gestures, the operation parameters, or the combinations of operation parameters, that cause the detection and/or registration of an operation may not be known and may not be determinable. That is, an operation (e.g. 'threshold') parameter that causes the registration of an operation and/or the determination of an unintentional operation may not be a known or determinable quantity. Altering the threshold parameter may then relate to altering the machine learning model (e.g. altering a weighting of the machine learning model and/or an input of the machine learning model), where each of the original operation parameter and the altered operation parameter may depend on the machine learning model but may not be known to a user.

Where a machine learning model is used, an input parameter (or a plurality of input parameters) are provided to the model as an input, where, based on this input to the model, the model then provides an output that indicates (for example) one or more of: a type of operation that relates to the input; whether an input relates to a gesture or a keypress; an operation that relates to the input; (e.g. a swipe gesture or a keypress of a specific key); a probability of (e.g. whether or not) the input relating to the determined operation; a probability that (e.g. whether or not) a gesture is accidental; etc.

The input parameters that lead to, for example, a determination that a swipe gesture has been input may not be known (but typically, for each operation there exists an operation parameter and/or a group of operation parameters that results in the machine learning model determining that an input relates to a certain operation). Altering an operation parameter may then comprise indirectly altering this (unknown) operation parameter, where this alteration may comprise altering a feature of the machine learning model (e.g. altering a weighting of the model and/or re-training the machine learning model model) and/or where this alteration may comprise altering a way in which an output of the machine learning model is evaluated (e.g. where the machine learning model provides a probability that a certain gesture has been performed, altering the parameter may comprise altering a threshold probability required for this gesture to be registered).

In a practical example, the keyboard 2000 may determine a set of coordinates relating to one or more touch events. This set of coordinates may be used to determine an operation performed by a user (e.g. by using the coordinates as an input to a machine learning model), where the operation may be determined by the machine learning model based on the coordinates (e.g. the parameters). This determination is dependent on one or more operation parameters, which operation parameters are an internal feature of the machine learning model and are typically not determinable by a user of the keyboard. The keyboard may then update these operation parameters based on the determined coordinates, e.g. to alter the operation parameters required for a subsequent similar operation to be registered. The alteration of the operation parameters may comprise altering a feature of a machine learning model (e.g. a weighting of a machine learning model and/or a way in which an output of a machine learning model is evaluated).

Typically, the alteration of the parameter is performed so as to reduce (or prevent) the occurrence of unintentional registrations of operations, while maintaining a keyboard that remains sensitive to inputs (and so feels responsive for a user). The user and/or the processor may be able to alter a sensitivity of the keyboard, which sensitivity relates to a probability of an unintentional operation being registered. The processor may automatically alter this sensitivity based on previous inputs of the user and/or the user may be able to alter this sensitivity manually. An appropriate sensitivity may depend on a user preference and/or on a user of the keyboard where in some situations it is more important to register operations quickly and reliably and in some situations it is important to avoid registering unintentional operations.

While the above description primarily uses a swipe operation as an example of a gesture, it will be appreciated that a variety of gestures are useable with the keyboard of the present disclosure and with the disclosed methods (e.g. tap gestures, scrolling gestures, pinch gestures, etc.).

Personalization, and the evaluation of historic inputs, may also be used to select an operation to perform where there is an ambiguity in an input; for example, where a user presses two keys at the same time. In this regard, the parameter required for the registering of an operation may be altered so as to avoid ambiguities. For example, a user that consistently presses both the 'd' and 'f' keys and then deletes two letters before repressing the 'f' key may have an increased parameter required for a keypress of the 'd' key to be registered. In particular, a parameter may be altered to increase a duration required between subsequent keypresses, so that any keypress of the 'd' key very shortly after a keypress of the 'f' key is not registered. It will be appreciated that there may be different parameters for each key or each pair of keys and, more generally, that in various embodiments the keyboard may be arranged to store and/or alter a large number of specific parameters or may be arranged to store and/or alter a smaller number of more general parameters.

The parameters required for a given operation may depend on a location at which this operation is performed. In this regard, a horizontal swiping motion across the home row is of the keyboard is more likely to occur inadvertently during typing than a swiping motion across the function keys. Therefore, the parameter for a swiping operation may be altered in dependence on a location of the operation so that registering a swiping operation requires a relatively long swipe across the home row, but only requires a relatively short swipe across the function keys. This alteration may be based on detected locations for previous (e.g. inadvertent) operations.

Typically, the parameters for a user are stored in the keyboard (e.g. in a memory of the keyboard) and the method of altering a parameter is performed by a processor of the keyboard. Such an implementation provides increased user security by avoiding the transfer of data away from the keyboard. Such an implementation also provides a keyboard that can readily be used with different devices.

Equally, the parameters may be stored and/or altered on a device associated with the keyboard and/or in an application associated with the keyboard.

In some embodiments, machine learning models are used to determine a parameter and/or to alter a parameter. Such embodiments may involve transmitting weightings (e.g. for a neural network) to the keyboard so that the keyboard is able to alter the parameter without transferring user data away from the keyboard. Equally, the machine leaning model may be implemented on a device connected to the keyboard, where this enables access to increased processing power without sharing user data outside of a local (e.g. permissioned) device. In such embodiments, the machine learning model is typically trained away from the keyboard (e.g. based on anonymized user data and/or based on user data that users have allowed to be shared) with the model weightings then being transmitted to the keyboard and/or the connected device. This enables the machine learning model to be trained using a large dataset on a device suitable for performing such training.

A machine learning model may be trained and/or updated based on inputs from a user, and this updated machine learning model may then be used to determine a parameter and/or to alter a parameter (and/or to determine an operation and/or to determine that an operation is unintentional). Updating the machine learning model may be based on labelling from the user, where the user may, for example, indicate that a gesture was unintentional and/or indicate that they intended to register a gesture. The machine learning model may then be updated, or retrained, based on such inputs. The labelling may be determined by the keyboard without an explicit input from the user (e.g. if a user registers an operation and then immediately reverses this operation it may be determined that the operation was unintentional). The (weightings of the) updated model may be output by the keyboard (e.g. so that it can be used by other users/keyboards).

In some embodiments, altering a parameter may comprise disabling or effectively disabling an operation (e.g. altering a parameter of a swiping gesture so that it is not possible for a user to make a valid swiping gesture). Such disabling may be subject to user confirmation and/or to a user input. And a user may thereafter be able to re-enable the operation. Equally, altering a parameter may comprise enabling an operation, where certain operations may be unlocked by a user following a period of accurate use of the keyboard. In this regard, certain operations may be more likely to be entered erroneously (e.g. gestures that involve only a single finger are more likely to be made inadvertently than gestures that involve multiple fingers). The keyboard may be arranged to disable such gestures as a default and then to enable such gestures as a user becomes more proficient with the keyboard.

Typically, the keyboard is associated with an application, where the enabling of gestures (and more generally the customization of any parameter and/or operation) may be implemented using the application.

The keyboard (e.g. the backlight) may be arranged to indicate when a parameter is altered and/or when an operation is enabled or disabled. Similarly, the keyboard may be arranged to output values and/or changes of parameters using a user interface (of the keyboard or of a connected device).

In some embodiments, the keyboard comprises a plurality of modes including one or more of: a typing mode that can be switched out of using a quick mode switching input (e.g. using a mode switching gesture); a typing mode that can only be switched out of using an accident-resistant mode switching input (e.g. using a specific mode switching key and/or button of the keyboard); a typing mode that can be switched out of using a quick mode switching input (e.g. by pressing any key); and a touch mode that can only be switched out of using an accident-resistant mode switching input (e.g. using a specific mode switching key and/or button of the keyboard).

The use of such modes (and in particular of all of these modes) enables the provision of a keyboard that enables quick switching between modes for users who are proficient with the keyboard and/or users who are concerned with speed while ensuring that accidental switching between modes can be prevented for users who are first using the keyboard and/or users who are concerned with reducing accidental mode switches.

One operation envisaged by the present disclosure is pressing a key to simulate a mouseclick. In this regard, a mouseclick may be implemented in a touch mode by a user tapping the keyboard, but certain users may prefer to press down to implement a mouseclick. Therefore, the keyboard may be arranged to register a keypress when a key is pressed separately to a gesture and to register a mouseclick when a key is pressed subsequently to a gesture. The required duration between a gesture and a keypress before the keyboard registers a keypress may be set by a parameter associated with the keypress and/or gesture, which parameter may be personalized for each user as set out above.

Touch Modes

As described above, typically, the keyboard 2000 has a number of input modes, where the keyboard is capable of switching between the input modes. In particular, the keyboard typically has at least a pointer input mode (e.g. a touch mode) and a keypress input mode (e.g. a typing mode). The operation of the touch sensor may also differ depending on the input mode that is selected.

As described above, typically the keyboard has various mode-switching inputs/operations. In various embodiments, one or more of the following inputs are used to change between modes:

a certain keypress relating to a keycap 2050 of the keyboard 2000 (e.g. 'F12');

a combination of keypresses (e.g. shift+control+F12);

a gesture detected by the touch sensor layer 2060. In particular, to switch to/from the pointer input mode, a gesture may be used such as a finger tap, a one-finger movement, a two-finger movement, a relative movement of two or more fingers (e.g. a pinch, vertical or horizontal swipes with three or four fingers or a grab in/out with four or five fingers).

In order to avoid undesired switching between modes, one or more of the following factors may also, or alternatively, be considered:

an experience of the user;

the position of a user's hands on the keyboard 2000. For example, if the user's hands are positioned in a typical typing position (e.g. with index fingers resting on the 'f' and 'j' keys) the keyboard may be locked in the keypress input mode and/or the keypress scanning mode;

the number, or location, of a user's hands and/or fingers on the keyboard 2000.

a resting time of a user's hands, e.g. if they have been stationary on the keyboard for a certain amount of time;

a previous or current action, e.g. if the user has been typing for a continuous period (or is currently typing). Typically, there is a delay between the last detected keypress and the consideration of a mode-switching input, e.g. it may not be possible to switch to the pointer input mode until at least 100 ms after depressing a keycap in the keypress input mode.

The context of a connected computer device. In particular, the applications open on the device and the current focus may be determined. For example, where an image editing application is open a grabbing gesture may enter an image editing mode; where a web browser is open, the same grabbing gesture may enter a scrolling mode.

The mode changing inputs and the factors to avoid undesired switching may be controlled by a user.

Alternatives and Modifications

It will be understood that the present invention has been described above purely by way of example, and modifications of detail can be made within the scope of the invention.

What is claimed is:

1. A method of controlling a keyboard comprising a backlight and a touch sensor, the method comprising:

detecting, using the touch sensor, a first gesture performed by a user of the keyboard; and controlling the backlight so as to emit light in dependence on the first gesture;

the method further comprising controlling the backlight to emit light in dependence on whether the keyboard is in a touch mode or a typing mode;

wherein the validity of an operation depends on the mode of the keyboard, such that:

gestures are valid operations when the keyboard is in the touch mode, but not when the keyboard is in the typing mode; and keypresses are valid when the keyboard is in the typing mode, but not when the keyboard is in the touch mode;

wherein the first gesture is a first type of gesture that operates as a touch gesture when the keyboard is in the touch mode and as a mode switching gesture for switching from the typing mode to the touch mode when the keyboard is in the touch mode;

wherein the method comprises providing a learning period prior to the detecting of the first gesture, wherein the method comprises ignoring gestures of the first type while the keyboard is in the touch mode during the calibration period; and wherein controlling the backlight comprises controlling the gesture so as to indicate a change in the mode of the keyboard and/or so as to indicate a switched-into mode of the keyboard.

2. The method of claim 1, comprising controlling the backlight to emit light in dependence on one or more of:

a parameter of the first gesture; and a type of the first gesture.

3. The method of claim 1, wherein the parameter comprises one or more of:

a length or distance of the first gesture;

a number of fingers used for the first gesture;

a distance of movement of a finger during the first gesture;

a speed of the first gesture;

a duration of the first gesture;

a direction of the first gesture;

a shape of the first gesture; and a time between the performance of the first gesture and the performance of a further gesture.

4. The method of claim 1, comprising controlling the backlight to emit light in dependence on whether an operation associated with the first gesture is a valid operation.

5. The method of claim 4, wherein the backlight is arranged to emit one or more of:

a first type of light when a valid operation is detected; and a second type of light when an invalid operation is detected.

6. The method of claim 1, comprising controlling the backlight so as to emit a type of light in dependence on the first gesture, wherein emitting a type of light in dependence on the first gesture comprises one or more of:

emitting a color of light in dependence on the first gesture;

emitting a pattern of light in dependence on the first gesture;

emitting a frequency of light in dependence on the first gesture;

emitting an intensity of light in dependence on the first gesture; and emitting a location of light in dependence on the first gesture.

7. The method of claim 1, comprising controlling the backlight to emit light so as to indicate one or more touch areas of the keyboard and/or controlling the backlight to emit light so as to indicate a touch area of the keyboard that is in use.

8. The method of claim 1, comprising controlling the backlight to emit light so as to indicate one or more of:

an application in use on a device associated with the keyboard; and a touch area associated with an application in use on a device associated with the keyboard.

9. The method of claim 1, comprising controlling the backlight to emit light so as to indicate one or more of:

a typing position of the user; and a target position for one or more hands of the user.

10. The method of claim 1, comprising controlling the backlight to emit light so as to operate in dependence on one or more of:

a status of the keyboard;

a connection status of the keyboard;

a device connected to the keyboard;

whether a device connected to the keyboard device is awake or asleep; and a progress of an operation of a device connected to the keyboard.

11. The method of claim 1, comprising controlling the backlight to emit light so as to provide an instruction to a user.

12. The method of claim 1, wherein the first gesture is detected during a window of time preceding the emitting of the light.

13. The method of claim 1, wherein the method comprises:

defining a first set of one or more parameters for the first type of gesture to be valid when the keyboard is in the touch mode; and defining a second, different, set of one or more parameters for the first type of gesture to be valid as a mode switching gesture when the keyboard is in the typing mode.

14. The method of claim 13, comprising, during the learning period:

determining input parameters for one or more input gestures without registering said input gestures; and defining the first set of parameters and/or the second set of parameters based on the determined one or more input parameters.

15. The method of claim 1, wherein the method comprises:

detecting, using the touch sensor, a further gesture performed by the user, the further gesture also being the first type of gesture;

determining that the user has learned the first type of gesture; and in dependence on the user having learned the first type of gesture, controlling the backlight so as to not emit light in response to the further gesture.

16. The method of claim 15, wherein determining that the user has learned the first type of gesture comprises:

detecting a threshold number of successful operations of the first type of gesture; and/or detecting that a threshold success rate has been reached for the first type of gesture.

17. The method of claim 1, comprising, during the learning period, controlling the keyboard to output different types of lights in response to the detection of different types of gestures without registering the gestures.

18. The method of claim 1, wherein the method comprises:

identifying the user operating the keyboard; and controlling the backlight in dependence on the identity of the user.

19. A keyboard comprising:

a touch sensor arranged to detect a first gesture performed by a user of the keyboard;

a backlight arranged to emit light, wherein the light emitted by the backlight is dependent on the first gesture;

the backlight further being arranged to emit light in dependence on whether the keyboard is in a touch mode or a typing mode;

wherein the validity of an operation depends on the mode of the keyboard, such that:

gestures are valid operations when the keyboard is in the touch mode, but not when the keyboard is in the typing mode; and keypresses are valid when the keyboard is in the typing mode, but not when the keyboard is in the touch mode;

wherein the first gesture is a first type of gesture that operates as a touch gesture when the keyboard is in the touch mode and as a mode switching gesture for switching from the typing mode to the touch mode when the keyboard is in the touch mode;

wherein the keyboard is arranged to provide a learning period prior to the detecting of the first gesture, wherein the keyboard is arranged to ignore gestures of the first type while the keyboard is in the touch mode during the calibration period; and wherein the backlight is arranged to indicate a change in the mode of the keyboard and/or to indicate a switched-into mode of the keyboard.

20. The keyboard of claim 19, comprising a control unit, wherein:

the control unit is arranged to distinguish between a touch and a keypress; and the control unit is arranged to control the backlight so as to control the emission of light by the backlight.

* * * * *